United States Patent
Sakashita et al.

(10) Patent No.: US 8,799,580 B2
(45) Date of Patent: Aug. 5, 2014

(54) STORAGE APPARATUS AND DATA PROCESSING METHOD

(71) Applicant: Hitachi, Ltd., Tokyo (JP)

(72) Inventors: Yuki Sakashita, Yokohama (JP); Yusuke Nonaka, Sagamihara (JP); Shintaro Kudo, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 5 days.

(21) Appl. No.: 13/643,440

(22) PCT Filed: Oct. 11, 2012

(86) PCT No.: PCT/JP2012/006518
§ 371 (c)(1),
(2), (4) Date: Feb. 6, 2013

(87) PCT Pub. No.: WO2014/057518
PCT Pub. Date: Apr. 17, 2014

(65) Prior Publication Data
US 2014/0108727 A1    Apr. 17, 2014

(51) Int. Cl.
*G06F 12/00* (2006.01)
*G06F 13/00* (2006.01)
*G06F 13/28* (2006.01)
*G06F 12/08* (2006.01)
*G06F 12/12* (2006.01)

(52) U.S. Cl.
CPC .......... *G06F 12/0862* (2013.01); *G06F 12/126* (2013.01); *G06F 12/0888* (2013.01)
USPC ............................ 711/133; 711/136; 711/137

(58) Field of Classification Search
CPC ..................... G06F 12/0862; G06F 12/126; G06F 12/0888
USPC .......................................... 711/133, 137–138
See application file for complete search history.

(56) References Cited

U.S. PATENT DOCUMENTS

| | | | |
|---|---|---|---|
| 5,625,794 | A | 4/1997 | Inoue et al. |
| 7,181,578 | B1 | 2/2007 | Guha et al. |
| 2005/0055533 | A1* | 3/2005 | Kadambi et al. ............ 712/1 |

(Continued)

FOREIGN PATENT DOCUMENTS

EP    1 785 876 A1    5/2007

OTHER PUBLICATIONS

PCT International Search Report and Written Opinion on application PCT/JP2012/006518 mailed Jun. 12, 2013; 9 pages.

*Primary Examiner* — Ryan Bertram
(74) *Attorney, Agent, or Firm* — Foley & Lardner LLP

(57) ABSTRACT

To raise the CPU cache hit rate and improve the I/O processing. Controller is CPU configured from a CPU core and a CPU cache wherein the CPU selects memory bus optimization execution processing or cache poisoning optimization execution processing according to an attribute of the access target volume on the basis of an access request. If the memory bus optimization execution processing is selected, CPU loads the target data into the CPU core after storing the target data in the main storage area, and if the cache poisoning optimization execution processing is selected, the CPU loads the target data into the CPU core after storing the target data in the temporary area of the CPU cache from the CPU memory, and the CPU core checks the target data which was loaded from the main storage area or the temporary area of the CPU cache.

15 Claims, 17 Drawing Sheets

(56) References Cited

U.S. PATENT DOCUMENTS

| | | | |
|---|---|---|---|
| 2005/0251629 A1* | 11/2005 | Fahs et al. ............... | 711/137 |
| 2006/0155939 A1 | 7/2006 | Nagasoe et al. | |
| 2009/0006761 A1* | 1/2009 | LeMire et al. ............ | 711/133 |
| 2011/0197011 A1 | 8/2011 | Suzuki et al. | |

* cited by examiner

FIG.3

VOL ATTRIBUTE MANAGEMENT TABLE (REMOTE COPY) — 1100

| VOL NUMBER (1101) | REMOTE COPY ADOPTED (1102) | SYNCHRONOUS/ ASYNCHRONOUS (1103) |
|---|---|---|
| 101 | ○ | SYNCHRONOUS |
| 102 | ○ | ASYNCHRONOUS |
| 103 |  | — |
| 104 | ○ | ASYNCHRONOUS |
| ... |  |  |

FIG.9

VOL ATTRIBUTE MANAGEMENT TABLE (INLINE COMPRESSION) 2100

| VOL NUMBER (2101) | INLINE COMPRESSION (2102) | COMPRESSION UNIT (2103) |
|---|---|---|
| 101 | ◯ | 32KB |
| 102 | ◯ | 64KB |
| 103 | — | — |
| 104 | ◯ | 64KB |
| ... | ... | ... |

STORAGE APPARATUS AND DATA PROCESSING METHOD

TECHNICAL FIELD

The present invention relates to a storage apparatus which comprises a controller for controlling data I/Os to and from a plurality of storage devices and for controlling cache data, and to a data processing method.

BACKGROUND ART

When a storage apparatus which is to be used in a computer system is configured, a storage apparatus with a built-in ASIC (Application Specific Integrated Circuit) as hardware designed specifically for a storage apparatus has been proposed (called ASIC storage hereinbelow) (see PTL1 in particular). In the ASIC storage disclosed in PTL1, a configuration is adopted in which, if an I/O (Input/Output) request is received, a CPU (Central Processing Unit) executes processing of the I/O request (hereinafter called I/O processing), the ASIC executes parity computation, authentication code computation, and compression computation, and the like, the CPU processes control information which is used in the I/O processing, the ASIC processes user data which is used in the parity computation and so on, and the CPU and ASIC are in charge of different processing.

In cases where ASIC storage is configured, a costly ASIC must be built in as hardware designed specifically for a storage apparatus. For this reason, in recent years, for the purpose of lowering overall system costs, the demand has increased for a storage apparatus which is configured without a built-in ASIC (hereinafter called ASIC-less storage). Here, the ASIC-less storage does not contain an ASIC and therefore I/O processing and computational processing such as parity computations are executed by the CPU, and hence the CPU processes control information which is used in the I/O processing and user data which is used in the parity computation and the like.

CITATION LIST

Patent Literature

[PTL 1]
U.S. Patent 2011/0197011

SUMMARY OF INVENTION

Technical Problem

As mentioned hereinabove, with an ASIC-less storage, the CPU processes control information which is used in I/O processing as well as user data which is used in parity computation and the like, and hence the following problem exists.

In ASIC-less storage, at the stage where the CPU executes I/O processing, in order to load the CPU with control information and user data, the CPU cache is used as a shared area for storing control information and user data respectively. Typically, the user data is larger in size than the control information and hence, if user data of a large capacity is loaded into the CPU cache of the CPU from the CPU memory, control information is removed from the CPU cache and there is a drop in the I/O processing performance. That is, in comparison with ASIC storage, ASIC-less storage exhibits a CPU cache hit rate drop as well as a drop in the I/O processing performance.

The present invention was conceived in view of the foregoing problems confronted by the prior art, and hence an object of the present invention is to provide a storage apparatus and a data processing method with which the CPU cache hit rate can be increased and the I/O processing performance can be improved.

Solution to Problem

In order to achieve the foregoing object, the present invention comprises a controller which specifies an access target volume among a plurality of volumes on the basis of an access request from an access request source, and executes data I/O processing on the specified access target volume, wherein the controller comprises a CPU which executes arithmetic processing and a CPU memory which is connected to the CPU via a CPU memory bus, wherein the CPU is configured from one or two or more CPU cores and a CPU cache which comprises a temporary area in a portion of a main storage area, wherein the CPU discriminates an attribute of the access target volume or target data which is the target of the data I/O processing on the basis of the access request and selects memory bus optimization execution processing or cache poisoning optimization execution processing in accordance with the discrimination result, wherein, if the memory bus optimization execution processing is selected, the CPU stores the target data among the data stored in the CPU memory in the main storage area of the CPU cache and loads the target data stored in the main storage area of the CPU cache into the CPU core, and wherein, if the cache poisoning optimization execution processing is selected, the CPU stores the target data among the data stored in the CPU memory in the temporary area of the CPU cache and loads the target data stored in the temporary area of the CPU cache into the CPU core, and wherein the CPU core executes at least processing to check the target data loaded from the main storage area or the temporary area of the CPU cache.

Advantageous Effects of Invention

With the present invention, the CPU cache hit rate can be raised and the I/O processing performance can be improved.

BRIEF DESCRIPTION OF DRAWINGS

FIG. 3 is a configuration diagram of a VOL attribution management table according to the first example.

FIG. 9 is a configuration diagram of a VOL attribute management table according to the second example.

DESCRIPTION OF EXAMPLES (Introductory Remarks)

Although the storage apparatus will be described hereinbelow under the premise that an ASIC-less storage is used, the present invention can also be applied to a storage apparatus with a similar problem to the foregoing problem even in the case of a storage apparatus with a built-in ASIC.

The storage apparatus may be illustrated with A or B appended to the end of the identification numbers of each part (device) which comprises the storage apparatus. This serves to identify each part of a primary storage apparatus which accommodates a remote copy function and each part of a secondary storage apparatus. For example, it can be seen that, if a CPU 40A and a CPU 40B exist as CPUs, the CPU 40A is the CPU in a primary storage apparatus 10A and the CPU 40B is a CPU in a secondary storage apparatus 10B.

First Example

A first example of the present invention will be described hereinbelow on the basis of the drawings.

(Basic Configuration)

Figure 1:
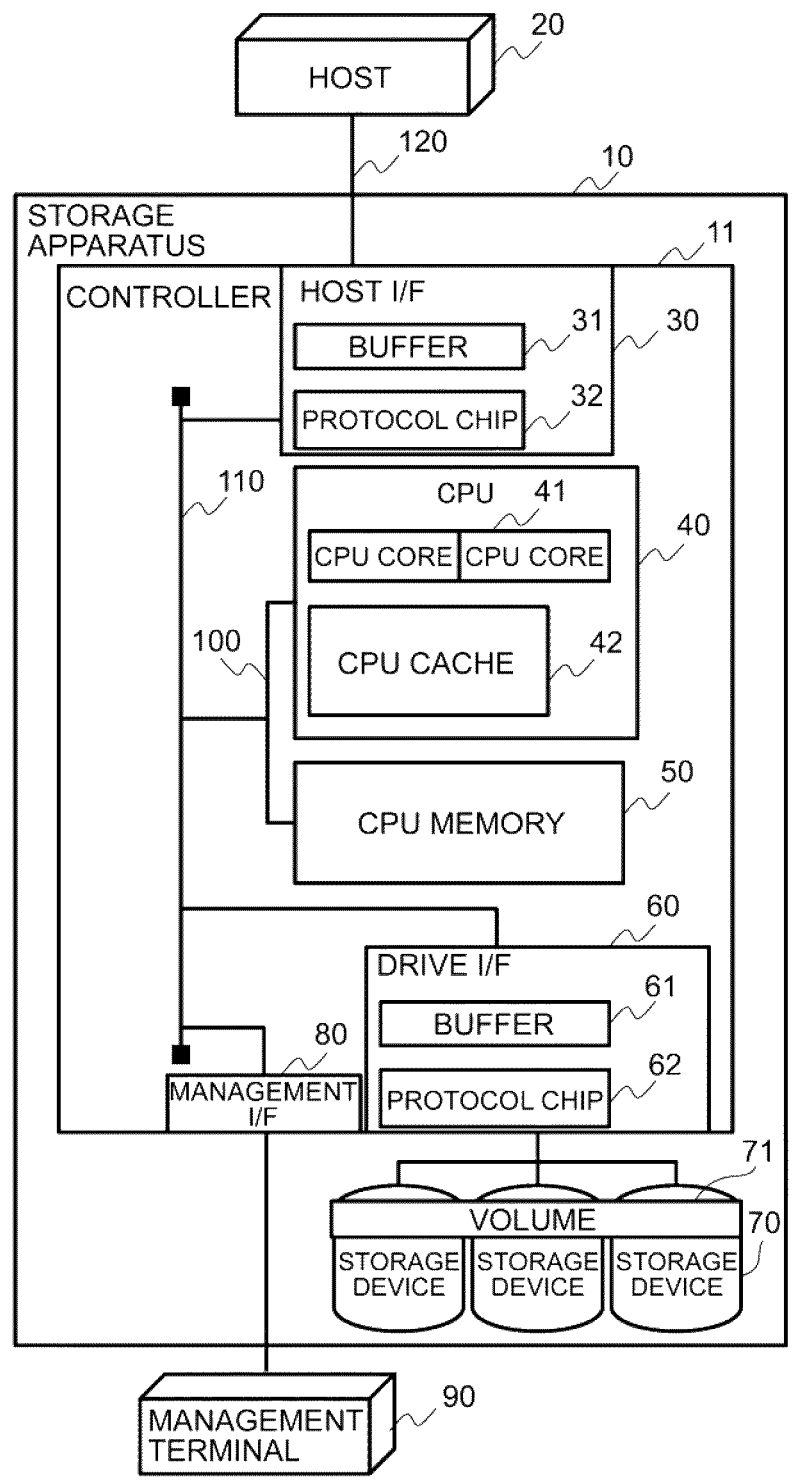
FIG. 1 is a block configuration diagram which shows the overall configuration of a computer system.

FIG. 1 is a configuration diagram of a computer system. In FIG. 1, the computer system is configured from a host computer 20, a storage apparatus 10, and a management terminal 90.

The host computer 20 is a computer device which comprises information processing resources such as a CPU, a memory, and an I/O interface, and is configured, for example, from a personal computer, a work station, or a mainframe or the like. By issuing an access request (command), for example a write request or write request, which designates a volume (logical volume) provided by the storage apparatus 10, to the storage apparatus 10, the host computer 20 is able to access the logical volume.

The storage apparatus 10 is configured from a controller 11, and a plurality of storage devices 70, where the controller 11 is configured comprising a host I/F (Interface) 30, a CPU 40, a CPU memory 50, a drive I/F 60, and a management I/F 80, and the parts (devices) in the controller 11 are interconnected via an internal network 110.

Upon receiving an access request, for example an access request (a read command or write command) from the host computer 20, the controller 11 executes data I/O processing to/from each storage device 70 based on the access request. Thereupon, the controller 11 specifies an access target volume among a plurality of volumes (logical volumes) 71 constructed in storage areas of each storage device 70 based on the access request, discriminates the attribute (volume attribute) of the specified access target volume or target data which is to be targeted for data I/O processing and, according to the discrimination result, selects and executes memory bus optimization execution processing or cache poisoning optimization execution processing.

Here, the volume attribute is an attribute which indicates that a synchronous or asynchronous remote copy function or an online compression (processing to compress data at the I/O processing stage) function has been applied to an access target volume.

The host I/F 30 comprises a buffer 31 and a protocol chip 32 and is configured as an interface which performs an exchange of information with the host computer 20 via the network 120. The buffer 31 is configured as a storage area for temporarily storing user data which is transmitted from the host computer 20. Thereupon, the buffer 31 is configured with a capacity which is equal to or more than a the I/O size maximum value. The protocol chip 32 executes authentication code computation for data authentication in an apparatus (in the storage apparatus 10) based on the user data stored in the buffer 31.

The CPU 40 is configured from one or more CPU cores 41 which execute computational processing or the like in accordance with program(s) and a CPU cache 42 comprising a data storage area, and is connected to the CPU memory 50 and connected to an internal network 110 via a CPU memory bus 100. In addition to a main storage area (not shown) which stores user data, the CPU cache 42 comprises a temporary area (not shown) which temporarily holds the user data and the main storage area has a hierarchical structure. Here, although the capacity of the CPU cache 42 varies, the present invention can be applied irrespective of the number of tiers or capacity. Furthermore, the CPU 40 performs access via the CPU memory bus 100 when the CPU cores 41 each access the CPU memory 50.

The drive I/F 60 comprises a buffer 61 and a protocol chip 62 and is configured as an interface which exchanges data with each of the storage devices 70. Thereupon, the buffer 61 is configured as storage areas which temporarily stores data. The buffer 61 is configured with a capacity of an I/O size maximum value or more. The protocol chip 62 comprises an authentication code computation performance for data authentication in the apparatus.

The storage devices 70 are each configured, for example, using a hard disk device, a semiconductor memory device, an optical disk device, a magneto-optical disk device, a magnetic tape device, and a flexible disk device and the like. The storage devices are devices to and from which data can be written and read.

If a hard disk device is used as each of the storage devices 70, SCSI (Small Computer System Interface) disks, SATA (Serial ATA) disks, ATA (AT Attachment) disks, and SAS (Serial Attached SCSI) disks and the like, can be used, for example.

Further, the storage devices 70 each comprise a RAID (Redundant Array of Inexpensive Disks), for example a RAID 4, a RAID 5, or a RAID 6, and the storage devices 70 can also be divided into a plurality of RAID groups. Here, a plurality of logical units (hereinafter sometimes called LU (Logical Unit)) and a plurality of logical volumes can also be formed in the physical storage area of each of the storage devices 70.

For example, one or more logical volumes 71 are constructed in the storage area of one or more storage devices 70. Here, the storage apparatus 10 is able to provide an access target volume 71 to the host computer 20.

The management I/F 80 is configured as an interface which exchanges information with the management terminal 90.

The management terminal 90 is a computer device which comprises information processing resources such as a CPU, a memory, and an I/O interface and is able to configure information for managing the storage apparatus 10 in the storage apparatus 10 via the management I/F 80.

Figure 2:
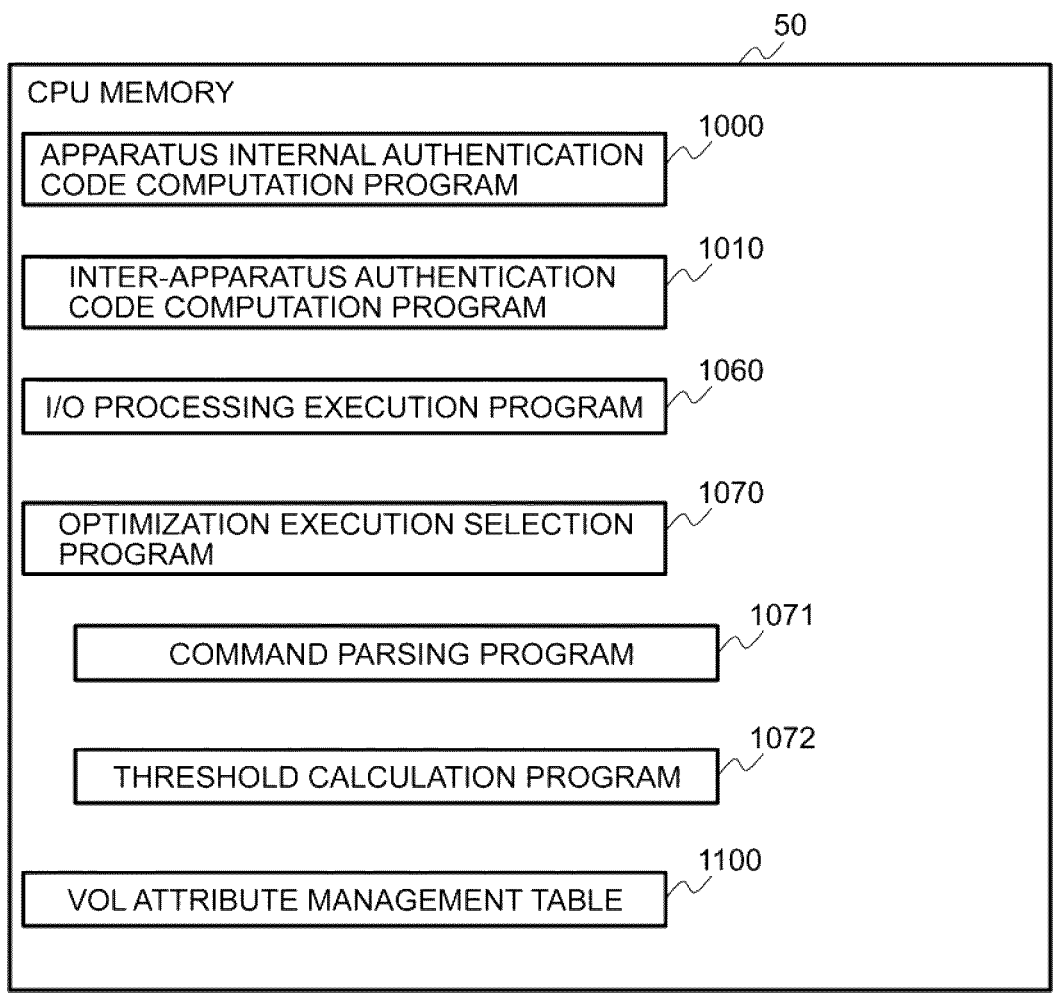
FIG. 2 is a configuration diagram of a CPU memory according to a first example.

FIG. 2 is a configuration diagram of a CPU memory in a storage apparatus for which a remote copy function is adopted. In FIG. 2, an apparatus internal authentication code computation program 1000, an inter-apparatus authentication code computation execution program 1010, an I/O processing execution program 1060, an optimization execution selection program 1070, a command parsing program 1071, and a threshold computation program 1072 are read by the CPU 40 as a plurality of microprograms to the CPU memory 50, and a VOL attribute management table 1100 is read by the CPU 40 as a table.

The apparatus internal authentication code computation program 1000 is a program enabling the CPU 40 to compute data authentication codes (hereinafter called apparatus internal authentication codes) when user data is transferred within the storage apparatus 10.

The inter-apparatus authentication code computation execution program 1010 is a program which enables the CPU 40 to compute data authentication codes (hereinafter called inter-apparatus authentication codes) when data is transferred from a primary storage apparatus to a secondary storage apparatus which is installed in a remote location. The inter-apparatus authentication codes are different codes from the apparatus internal authentication codes.

The I/O processing execution program 1060 is a program which enables the controller 11 to process an I/O request from the host computer 20 to the storage apparatus 10.

The optimization execution selection program 1070 is a program which, when I/O processing enables the controller 11 to select either memory bus optimization execution processing or cache poisoning optimization execution processing when executing I/O processing of a volume (VOL) for which a remote copy function is adopted. Thereupon, the optimization execution selection program 1070 can be used as a program which enables the controller 11 to perform command parsing and table referencing at the stage where I/O processing is executed, specify the attribute of the access target volume, and select either memory optimization execution processing or cache poisoning optimization execution processing on the basis of the specified volume attribute. Note that the volume attribute referenced by the optimization execution selection program 1070 is different in each example, and therefore the optimization execution selection program will be described for each example.

Here, the memory bus optimization execution processing is a method for reducing the number of times the user data passes through the CPU memory bus 100. In memory bus optimization execution processing, user data is cached in the CPU cache 42 from the CPU memory 50 via the CPU memory bus 100, and a plurality of processing is continuously executed by the CPU cores 41 by using the user data which has been cached in the CPU cache 42. That is, in the second or subsequent processing, user data is loaded from the CPU cache 42 onto the CPU cores 41 without caching the user data from the CPU memory 50 to the CPU cache 42 via the CPU memory bus 100, and hence the number of times the user data passes through the CPU memory bus 100 can be reduced.

The cache poisoning optimization execution processing is a method enabling the CPU cache 42 to suppress poisoning by means of user data. If the cache poisoning optimization execution processing is used, by using a CPU cache control command for the user data, the consumption amount of the CPU cache 42 can be suppressed. More specifically, if there is a mixture of alignment user data (user data with a start address which is a multiple of 16) and nonalignment user data (user data with a start address which is not a multiple of 16), the CPU cache 42 uses different CPU cache control commands depending on whether the user data is alignment user data or nonalignment user data.

For example, for alignment user data, an execute command to load user data onto the CPU core 41 while the poisoning of the CPU cache 42 is suppressed is used, and for nonalignment user data, user data is released from the CPU cache 42 using a flash command after processing is complete.

Furthermore, in processing where the processing target user data is contiguous in the address space and where the processing time of the computation of the CPU 40 is greater than the delay time when prefetching the user data, such as authentication code computation, compression computation, redundancy removal computation, or encryption computation, for example, a command to execute a prefetch while suppressing poisoning of the CPU cache 42 is used for user data of the second and subsequent processing units.

The command parsing program 1071 is a program which enables the controller 11 to parse I/O commands from the host computer 20 and specify the access target VOL number, the access target address, and the I/O size and the like on the basis of the parsing result.

The threshold computation program 1072 is a program which calculates the I/O size threshold which is used when selecting memory bus optimization execution processing or cache poisoning optimization execution processing from configuration information which is static information (the frequency of the CPU 40 (CPU frequency), the CPU cache capacity (the capacity of the CPU cache 42), and the bandwidth of the CPU memory bus 100), and from information on microprogram processing efficiency. When calculating the I/O size threshold, [the threshold computation program 1072] is able to determine a value which is X % of the capacity as a threshold T0 for each cache if an L1 cache, L2 cache, and L3 cache are contained as the CPU cache 42, for example. Here, if the I/O size of the processing target user data is less than the threshold T0, [the threshold computation program 1072] is able to select memory bus optimization execution processing, and if the I/O size is equal to or more than the threshold T0, [the threshold computation program 1072] is able to select cache poisoning optimization execution processing.

The I/O performance can be improved by suitably selecting and executing either the memory bus optimization execution processing or the cache poisoning optimization execution processing, by determining the I/O size threshold T0 in this way, for a system in which the I/O processing efficiency of the hardware or microprogram with a small CPU cache capacity is high and there is a large poisoning effect of the CPU cache 42 by the user data.

Further, the following method can be adopted when determining the I/O size threshold. For example, in the storage apparatus 10 which comprises a remote copy function, if the I/O size in one I/O processing is S1, the frequency with which the user data passes through the CPU memory bus 100 per I/O processing is C1, the frequency of I/O requests which the CPU 40 is able to process per second is C2, and the bandwidth of the CPU memory bus 100 is M, then C1 is determined by the data flow of the I/O processing and C2 is determined by the CPU performance such as the frequency of the CPU 40 and the capacity of the CPU cache 42 and the processing efficiency of the microprogram which executes the I/O processing.

Here, suppose that, if the total I/O size is S1, S1 is a threshold T1 when the following equation holds true, then S1=M/(C1*C2) is true.

Here, if the I/O size of the processing target user data is less than the threshold T1, [the threshold computation program 1072] is able to select the cache poisoning optimization execution processing, and if the I/O size is equal to or more than the threshold T1, [threshold computation program 1072] is able to select the memory bus optimization execution processing. The I/O performance can be improved by selecting either cache poisoning optimization execution processing or memory bus optimization execution processing for hardware for which the bandwidth of the CPU memory bus 100 is small by determining the threshold T1, and executing the processing.

The VOL attribute management table 1100 is a table enabling the controller 11 to manage attributes (volume attributes) which are applied to the access target volumes (VOL).

Further, the CPU memory 50 stores information relating to configuration information which is used by the threshold computation program 1072 and the threshold which is calculated by the threshold computation program 1072, and stores control information which is used by the CPU 40 in the I/O processing.

Here, the control information which is used by the storage apparatus 10 may include, for example, information relating to the cache directory for discriminating whether there is access target user data in the CPU memory which is user data management information that is referenced when the storage apparatus 10 receives an I/O request from the host computer 20, or information which is recorded in the copy pair information management table for managing the copy source and copy destination of a remote copy in the storage apparatus 10 which comprises a remote copy function.

FIG. 3 is a configuration diagram of a VOL attribute management table. In FIG. 3, the VOL attribute management table 1100 is a table for managing the attributes of each of the volumes 71. This VOL attribute management table 1100 is used to enable the controller 11 to discriminate the attribute of each volume 71 when the memory bus optimization execution processing or the cache poisoning optimization execution processing is selected. For example, if the controller 11 is used to check whether the remote copy function has been applied, and if the remote copy function has been applied to the volume 71, is used to check whether a synchronous remote copy function or an asynchronous remote copy function exists as the remote copy function. The attributes managed in the VOL attribute management table 1100 are different for each Example and describe the content of the VOL attribute management table 1100 according to each Example. Further, in this specification, by assigning applied target function names at the foot of the VOL attribute management table, the columns are represented differently in each Example.

The VOL attribute management table 1100 is configured from a VOL number column 1101, a remote copy application column 1102, and a synchronous/asynchronous column 1103. The VOL number column 1101 stores a VOL number enabling the controller 11 to identify the volume 71 which is accessed in the I/O processing. The remote copy application column 1102 stores information relating to whether remote copying is applied to each volume (VOL) 71. For example, if remote copying is applied to a volume 71, the remote copy application column 1102 stores "∘". The synchronous/asynchronous column 1103 stores the information "synchronous" if the remote copy function is applied to the volume (VOL) 71 and the synchronous remote copy function is applied, but stores the information "asynchronous" if the remote copy function is applied to the volume (VOL) 71 and the asynchronous remote copy function is applied.

Figure 4:
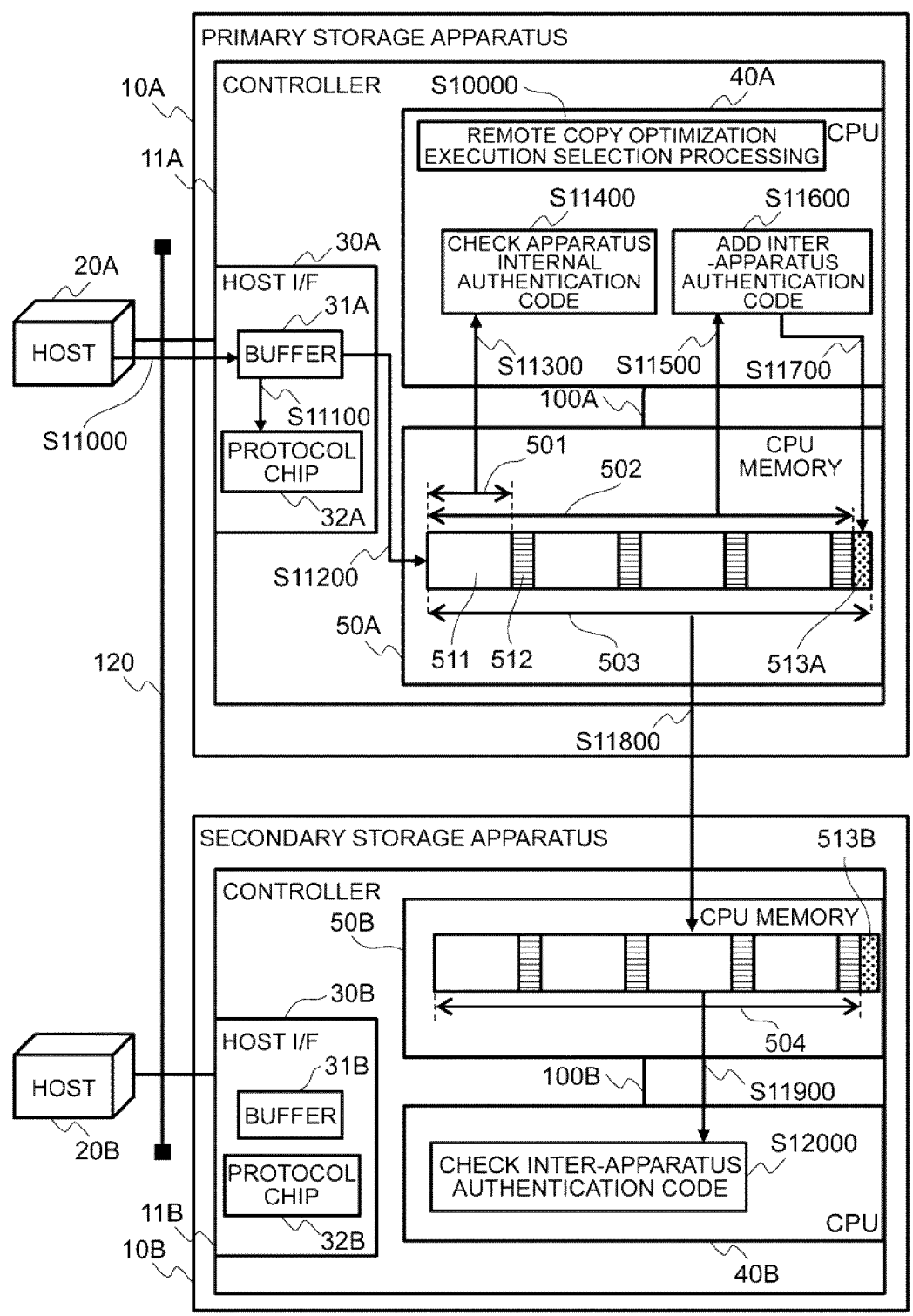
FIG. 4 is an explanatory diagram serving to illustrate a remote copy function according to the first example.

FIG. 4 is an explanatory diagram serving to illustrate remote copy function processing. In FIG. 4, this processing is processing which is performed between the primary storage apparatus 10A and the secondary storage apparatus 10B, and which is started as a result of a controller 11A executing the I/O processing execution program 1060. Note that, although this is illustrated in FIG. 4 without specifying which of the memory bus optimization execution processing and cache poisoning optimization execution processing is selected, when the present invention is implemented, either the memory bus optimization execution processing shown in FIG. 5 or the cache poisoning optimization execution processing shown in FIG. 6, which will be described subsequently, is selected.

First, upon receiving a write command from the host computer 20A, the controller 11A calls the optimization execution selection program 1070 and performs remote copy optimization execution selection processing (S10000).

When a write command is then issued from the host computer 20A to the primary storage apparatus 10A, the host I/F 30A of the primary storage apparatus 10A communicates with the host computer 20A via the network 120, and if user data is transferred from the host computer 20A, the host I/F 30A stores the transferred user data in the buffer 31A (S11000).

A protocol chip 32A then computes an apparatus internal authentication code on the basis of the user data stored in the buffer 31A and appends the computation result to the user data (S11100).

Here, among the standardized authentication codes, there are units to which authentication codes have been added. For example, T10-DIF, which is an authentication code determined by T10 which is one technical committee of the International Committee for Information Technology Standards, defines an 8-byte authentication code which is computed using an arithmetic equation determined by T10 for 512-byte user data. Hereinafter, a unit to which an authentication code is added is called an authentication unit. For example, a T10-DIF authentication code is 512 bytes.

The protocol chip 32A then transfers the user data stored in the buffer 31A and the apparatus internal authentication code to the CPU memory 50A (S11200).

Subsequently, in order to check for data corruption while the user data is being transferred from the host I/F 30A to the CPU memory 50A, the CPU 40A then loads, from the CPU memory 50A, user data 511 of the authentication unit 501 of the apparatus internal authentication code among the transferred user data together with an apparatus internal authentication code 512 which is obtained as a result of the protocol chip 32A appending [the computation result] to the user data 511 (S11300).

The CPU 40A then calls an apparatus internal authentication code computation program 1000 and compares the apparatus internal authentication code (computation result), obtained by performing computation based on the user data 511, with the apparatus internal authentication code 512 appended by the protocol chip 32A, and checks whether processing thereof has been generated (S11400).

Thereupon, the CPU 40A executes the processing of steps S11300 and S11400 for all the user data. For example, if the authentication unit is 512 bytes and the I/O size is 4 KB, the CPU 40A repeats the steps S11300 and S11400 eight times. Further, if it is confirmed that all the user data has been processed, the CPU 40A transmits "Good" (information indicating a successful transfer via one of the SCSI commands) to the host computer 20A.

The CPU 40A then loads user data from the CPU memory 50A in order to append, to the user data, an inter-apparatus authentication code 513A for transfer to the remote secondary storage apparatus 10B (S11500).

Here, an authentication unit 503 of an inter-apparatus authentication code may or may not be inclusive of the size of the apparatus internal authentication code (eight bytes in the case of T10-DIF, for example) (FIG. 4 shows the flow of the transfer including the apparatus internal authentication code).

The CPU 40A then uses the inter-apparatus authentication code computation execution program 1010 to compute the inter-apparatus authentication code based on the user data loaded from the CPU memory 50A (S11600).

Subsequently, the CPU 40A appends the inter-apparatus authentication code computed in step S11600 to the user data to be transferred (S11700) and transfers the user data to which the inter-apparatus authentication code is appended to the secondary storage apparatus 10B (S11800).

Thereafter, in the primary storage apparatus 10A and the secondary storage apparatus 10B, the host I/F 30A and the host I/F 30B communicate via an external network 120. The external network 120 is a network via which communication takes place using a TCP/IP protocol or other protocol.

The CPU 40B of the secondary storage apparatus 10B then loads, from the CPU memory 50A, the user data of an authentication unit 504 and an inter-apparatus authentication code 513B appended to the user data, which were transferred from the CPU 40A, in order to check whether data corruption has occurred during the transfer to the CPU memory 50B (S11900).

The CPU 40B then uses the inter-apparatus authentication code computation execution program 1010 to compute the inter-apparatus authentication code for the user data loaded in step 11900 and compares the inter-apparatus authentication code obtained in the computation with the inter-apparatus authentication code 513B transferred from the CPU 40A, and checks whether data corruption has occurred (S12000), and if data corruption has not occurred, determines that the remote copy has been successful (S12000) and ends the processing. As a result, data corruption when remote copying the user data of the primary storage apparatus 10A to the secondary storage apparatus 10B can be detected and storage of erroneous data in the secondary storage apparatus 10B can be prevented.

Figure 5:
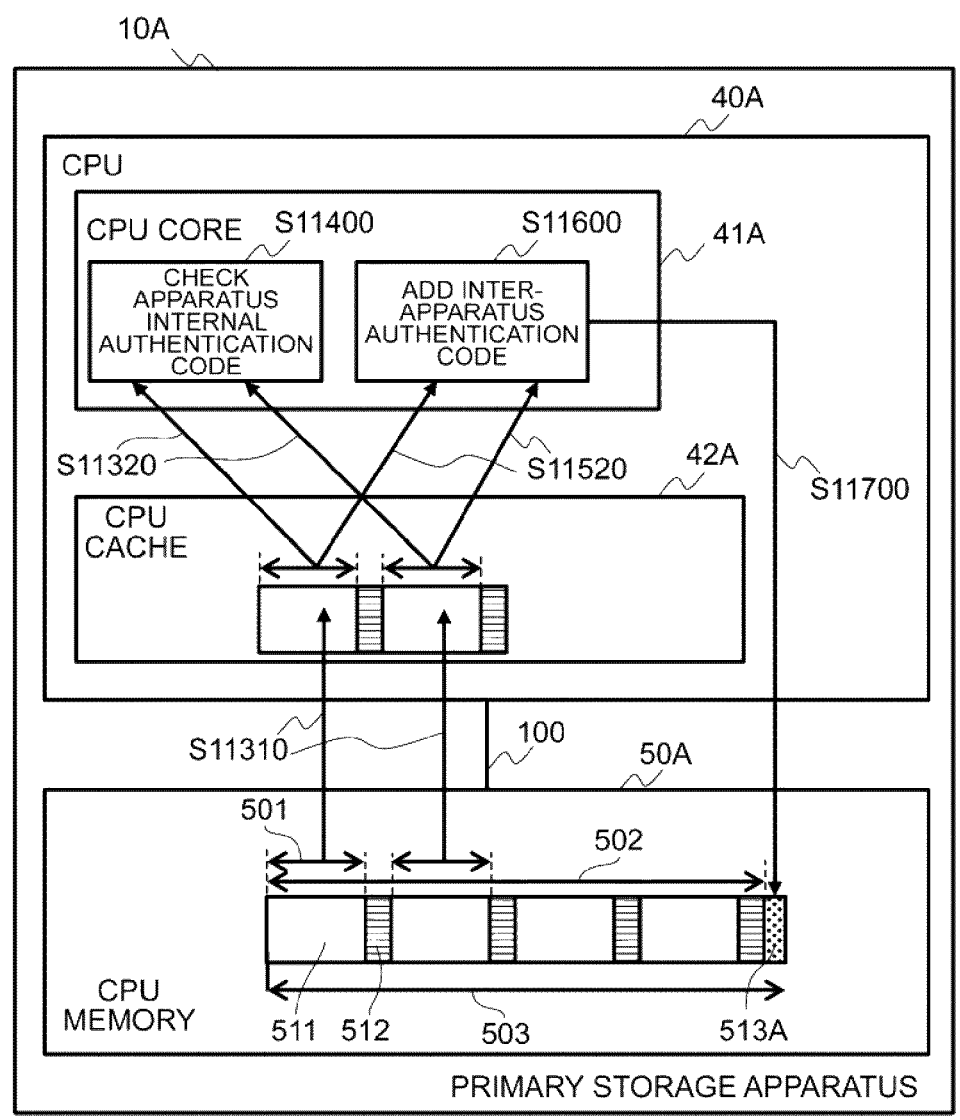
FIG. 5 is an explanatory diagram serving to illustrate memory bus optimization execution processing according to the first example.

FIG. 5 is an explanatory diagram serving to illustrate memory bus optimization execution processing of the remote copy function. This processing is started as a result of the CPU 40A executing an I/O processing execution program 1060. Note that as the processing in FIG. 5, after steps S11000, S11100, and S11200 in FIG. 4, the processing of steps S11310, S11320, S11400, S11520, and S11600 is executed instead of the processing in FIG. 4 (S11300, S11400, S11500, S11600, S11700).

Here, in the memory bus optimization execution processing, in step S11310, the CPU 40A caches the user data of CPU memory 50A in the CPU cache 41A and continuously executes the processing of steps S11400 and S11600, and hence the frequency with which user data is loaded from the CPU memory 50A to the CPU cache 42A can be reduced from two times to one time. In other words, the frequency with which the user data passes through the CPU memory bus 100 can be reduced from two times to one time and the I/O processing performance can be improved.

More specifically, the CPU 40A sequentially caches the size user data 511 of the authentication unit 501 and apparatus internal authentication code 512, which were transferred from the protocol chip 32A in the host I/F 30A to the CPU memory 50A, to the CPU cache 42 (S11310). Here, the CPU 40A caches the user data and the CPU cache 42A may be either a CPU cache occupied by each CPU core 41A or a CPU cache which is shared between each of the CPU cores 41A.

The CPU 40A then sequentially loads the user data 511 of the authentication unit 501 and the apparatus internal authentication code 512, which were cached in the CPU cache 42A in step S11310, into the CPU core 41A (S11320). However, although user data is represented here as being loaded into the CPU core 41A in order to simplify the description, the user data is physically stored in the register within the CPU core 41A. Further, the capacity of the register is small in comparison with the user data size, and hence the CPU 40A loads user data equivalent to the capacity which can be stored into the register and executes the processing for the user data which was loaded into the register, and then loads address user data into the register and repeats the processing for the user data loaded into the register.

The CPU 40A then calls the apparatus internal authentication code computation execution program 1000, sequentially computes the apparatus internal authentication code on the basis of the user data 511 of the authentication unit 501 which was loaded into the CPU core 41A in step S11320, compares each computation result with the apparatus internal authentication code 512 which was appended by the protocol chip 32A for each of the user data of the authentication unit 501 and checks whether data corruption has not occurred (S11400).

The CPU 40A subsequently then sequentially loads the user data 511 of the authentication unit 501 which was cached in the CPU cache 42A in step S11310 into the CPU core 41A (S11520). Here, the CPU core into which the user data has been loaded may be the same CPU core as the CPU core into which the user data was loaded in step S11320 or may be another CPU core, but if the user data is loaded into another CPU core, user data must be loaded from the CPU cache 42A which is shared between the CPU cores.

The CPU 40A then calls the inter-apparatus authentication code computation execution program 1010, sequentially computes an inter-apparatus authentication code based on the user data 511 of the authentication unit 501 which was loaded into the CPU core 41A in step S11520, and generates the inter-apparatus authentication code 513A (S11600). Here, if the authentication unit of the inter-apparatus authentication code 513A is larger than the authentication unit of the apparatus internal authentication code, the CPU 40A holds, among the computation results of the inter-apparatus authentication codes, computation results equivalent to the authentication units of the apparatus internal authentication codes as a temporary intermediate solution. Subsequently, the CPU 40A then also executes similar processing for address user data, and if the processing of the user data equivalent to the authentication unit of the inter-apparatus authentication code is complete, generates the inter-apparatus authentication code 513A.

The CPU core 41A then appends the generated inter-apparatus authentication code 513A to the user data of the authentication unit 502 which is stored in the CPU memory 50A (S11700) and ends the processing.

If the CPU core 41A executes processing to check the inter-apparatus authentication code (S11400) and processing to append the inter-apparatus authentication code to the user data (S11600), the CPU 40A selects the memory bus optimization execution processing, sequentially caches the user data 511 of the authentication unit 501, which was stored in the CPU memory 50A, in the CPU cache 42A, sequentially loads the user data 511 of the authentication unit 501, which was cached in the CPU cache 42A, into the CPU core 41A and, as a result of the CPU core 41A continuously executing processing to check the apparatus internal authentication code (S11400) and processing to append an inter-apparatus authentication code to the user data (S11600), the frequency with which the user data passes through the CPU memory bus 100 can be reduced and the I/O processing performance can be improved.

Meanwhile, when the CPU core 41A executes the processing to check the apparatus internal authentication code (S11400) and the processing to append an inter-apparatus authentication code to the user data (S11600) separately, processing is executed to cache the user data, which is stored in the CPU memory 50A, in the CPU cache 42A via the CPU memory bus 100 in order to check the apparatus internal authentication code, and to cache the user data stored in the CPU memory 50A in the CPU cache 42A via the CPU memory bus 100 in order to append the inter-apparatus authentication code to the user data, and the frequency with which the user data passes through the CPU memory bus 100 is high.

Figure 6:
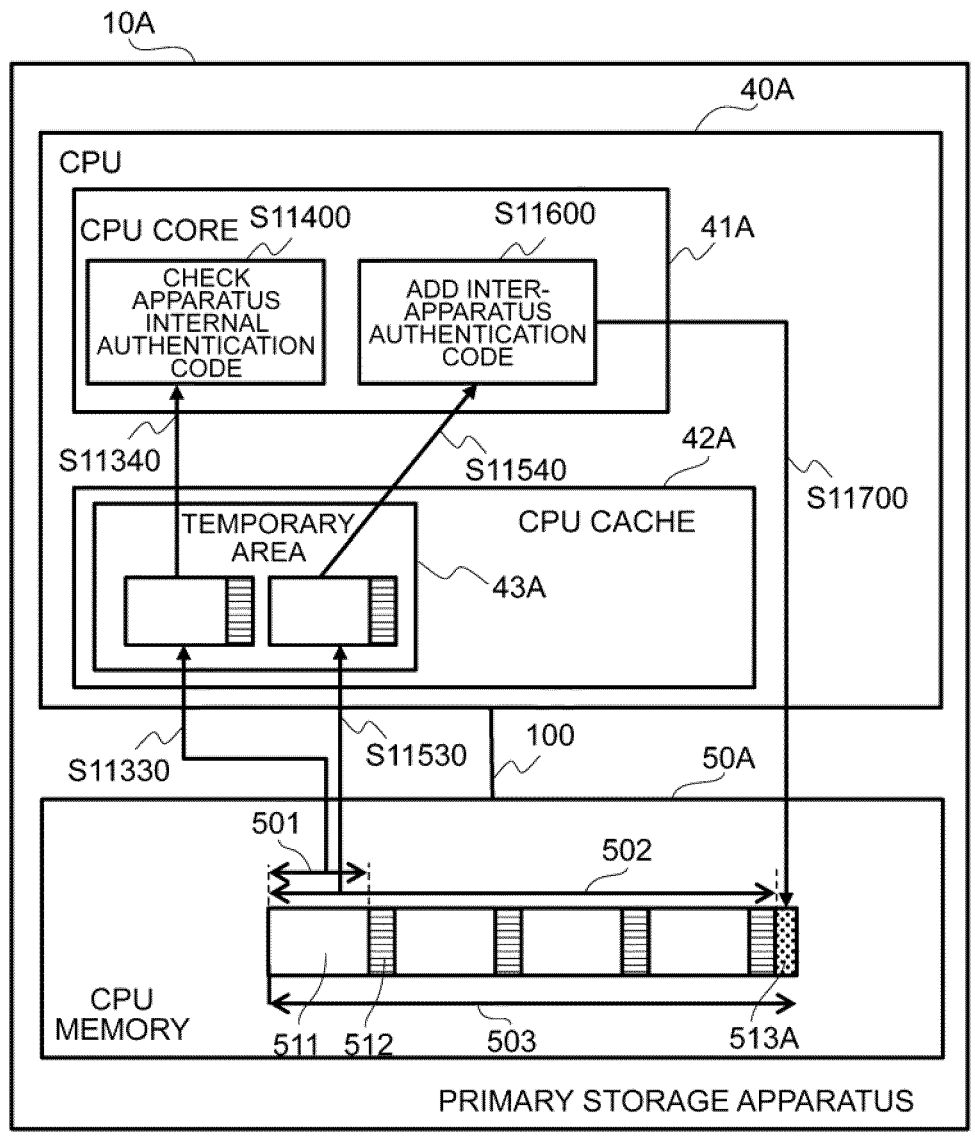
FIG. 6 is an explanatory diagram serving to illustrate cache poisoning optimization execution processing according to the first example.

FIG. 6 is an explanatory diagram serving to illustrate the cache poisoning optimization execution processing of the remote copy function. Note that, in the processing in FIG. 6, the processing of S11330, S11340, S11400, S11530, S11540, S11600, and S11700 is executed instead of the processing in FIG. 4 (S11300, S11400, S11500, S11600, S11700) after steps S11000, S11100, and S11200 in FIG. 4 in the same way as the processing in FIG. 5.

In a case where the cache poisoning optimization execution processing is used, the user data 511 of the authentication unit 501 and the user data of the inter-apparatus authentication code 502 are each loaded into a temporary area 43A of the CPU cache 42A from the CPU memory 50A without caching the user data in the main storage area of the CPU cache 42A, and the user data loaded into the temporary area 43A are each loaded into the CPU core 41A, and hence the main storage area of the CPU cache 42A is prevented from being poisoned by the user data and the I/O processing performance can be improved.

More specifically, the CPU 40A stores, among the user data stored in the CPU memory 50A, the size user data 511 of the authentication unit 501 and the inter-apparatus authentication code 512 appended to the user data 511, in the temporary area 43A in the CPU cache 42A (S11330). This temporary area 43A is a storage area which is not used when the CPU 40A caches the user data in the CPU cache 42A. Meanwhile, the user data 511 and the authentication code 512 which were stored in the temporary area 43A are released after being loaded into the CPU cache 42A. Hence, by temporarily storing the user data 511 and the authentication code 512 in the temporary area 43A, poisoning of the main storage area of the CPU cache 42A can be kept to a minimum.

Other methods for suppressing poisoning of the CPU cache 42A which may be considered, although the method will vary depending on the Example of the CPU 40A, are a method in which user data is temporarily cached from the CPU memory 50A to the CPU cache 42A and a tag for immediately releasing the cached user data is appended to the user data, and a method in which the cached user data is stored directly in the register of the CPU core 41A from the CPU memory 50A.

The CPU 40A then loads the user data 511 and the apparatus internal authentication code 512 which were stored in the temporary area 43A in step S11330 into the CPU core 41A (S11340).

The CPU 40A subsequently calls the apparatus internal authentication code computation execution program 1000, computes the apparatus internal authentication code based on the user data 511 loaded into the CPU core 41A in step S11340, compares the computation result with the apparatus internal authentication code 512 appended to the user data 511 by the protocol chip 32A, and checks whether data corruption has occurred (S11400).

Subsequently, similarly to the processing of step S11330, the CPU 40A then stores, among the user data of the CPU memory 50A, the user data of the authentication unit 502 (user data including four user data 511) in the temporary area 43A (S11530), and loads the user data of the authentication unit 502 which has been stored in the temporary area 43A into the CPU core 41A (S11540).

The CPU 40A then calls the inter-apparatus authentication code computation execution program 1010, computes the inter-apparatus authentication code based on the user data loaded into the CPU core 41A in step S11540 and generates the inter-apparatus authentication code 513A (S11600). Here, if the authentication unit of the inter-apparatus authentication code is greater than the authentication unit of the apparatus internal authentication code, the CPU 40A holds, among the computation results of the inter-apparatus authentication code, computation results equivalent to the authentication unit of the apparatus internal authentication code as a temporary intermediate solution. Thereafter, the CPU 40A also subsequently executes the same processing for the address user data, and if processing is complete for the user data equivalent to the authentication unit of the inter-apparatus authentication code, the CPU 40A uses the held intermediate solution to generate the inter-apparatus authentication code 513A.

The CPU 41A subsequently appends the inter-apparatus authentication code 513A to the user data of the authentication unit 502 which is stored in the CPU memory 50A (S11700) and ends the processing.

If the processing to check the apparatus internal authentication code (S11400) and processing to append the inter-apparatus authentication code to the user data (S11600) are executed separately by the CPU core 41A, the CPU 40A is able to select the cache poisoning optimization execution processing and, without caching the user data in the main storage area of the CPU cache 42A, is able to store each of the user data 511 of the authentication unit 501 and the user data of the inter-apparatus authentication unit 502 from the CPU memory 50A in the temporary area 43A of the CPU cache 42A, and load each of the user data stored in the temporary area 43A in the CPU core 41A, and hence the main storage area of the CPU cache 42A is prevented from being poisoned by the user data and the I/O processing performance can be improved.

Figure 7:
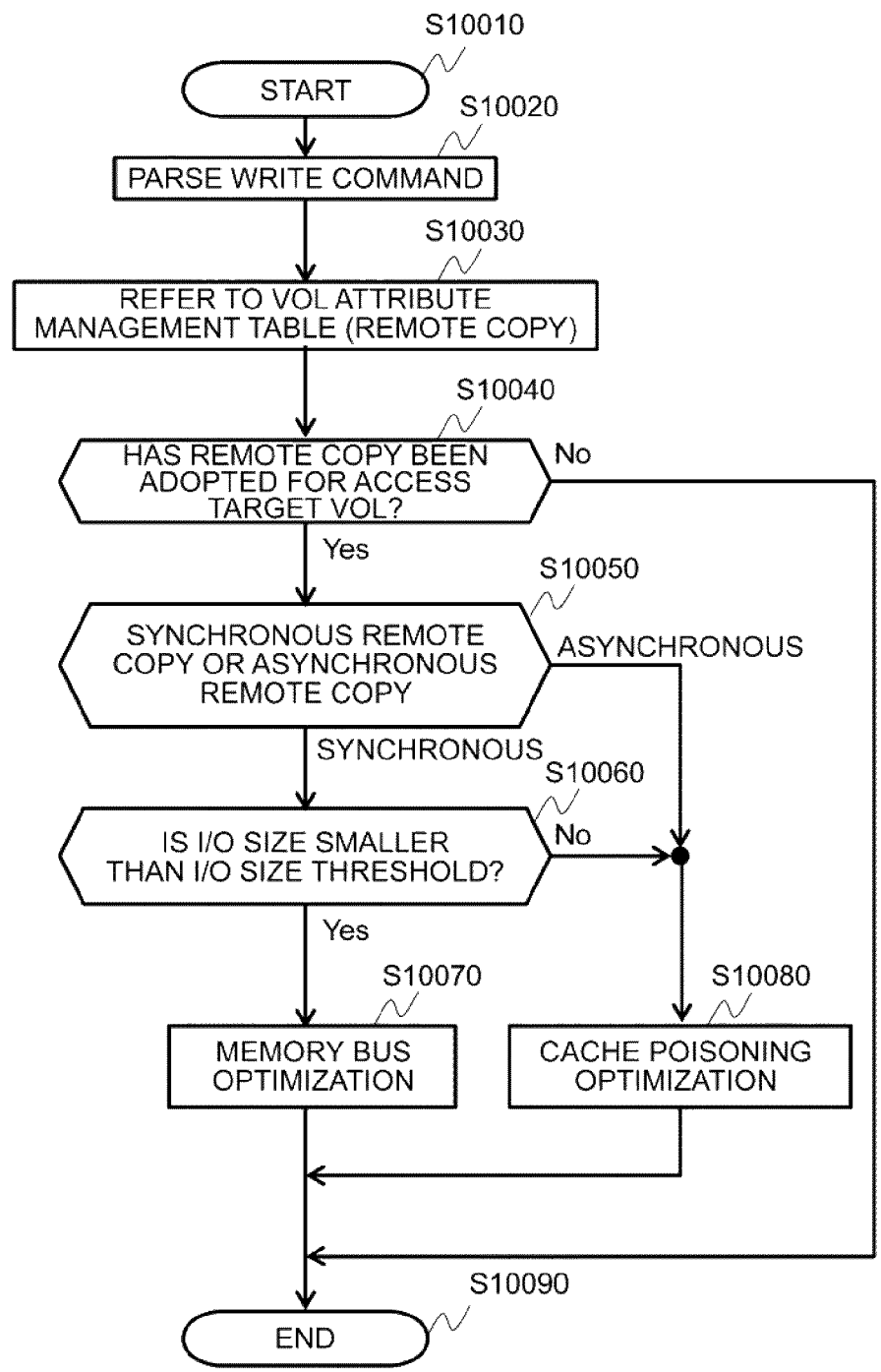
FIG. 7 is a flowchart which shows processing serving to select optimization execution processing according to the first example.

FIG. 7 is a flowchart serving to illustrate the remote copy optimization execution selection processing of the remote copy function. This processing is started as a result of the controller 11 executing the remote copy optimization execution selection processing each time a write request is received from the host computer 20. At the processing stage, write command parsing, referencing the VOL attribute management table 1100, processing to compare the threshold computed by the threshold computation program 1072 with the I/O size, and processing to select either memory bus optimization execution processing or cache poisoning optimization execution processing depending on the volume attribute.

First of all, upon receiving a write request from the host computer 20, the controller 11 starts the remote copy optimization execution selection processing (S10010).

The CPU 40A subsequently parses a write request (write command) which is issued from the host computer 20 to the storage apparatus 10A and specifies the access target VOL number, and the address and I/O size of the access target volume 71 (S10020).

On the basis of the analysis result, the CPU 40A then takes the access target VOL number specified in step S10020 as a key and refers to the VOL attribute management table 1100 to acquire information indicating the existence of the remote copy function applied to the volume 71 corresponding to the access target VOL number and, in a case where the remote copy function is applied to the volume 71 which corresponds to the VOL number, information indicating whether a synchronous remote copy function or an asynchronous remote copy function has been applied to the volume 71 corresponding to the access target VOL number (S10030).

Thereafter, the CPU 40A determines whether or not the remote copy function has been applied to the access target volume 71 on the basis of the information obtained by referring to the VOL attribute management table 1100 in step S10030 (S10040), and if it is determined that the remote copy function has been applied to the access target volume 71, moves to step S10050, and if it is determined that the remote copy function has not been applied to the access target volume 71, moves to step S10090 and ends the processing of this routine.

The CPU 40A then determines whether the remote copy function applied to the access target volume 71 is a synchronous remote copy function or an asynchronous remote copy on the basis of the information obtained by referencing the VOL attribute management table 1100 in step S10030 (S10050), and if it is determined in this step that the function is a synchronous remote copy function, moves to step S10060, and if it is determined that the function is an asynchronous remote copy function in this step, moves to step S10080.

The CPU 40A then compares the I/O size with the threshold computed by the threshold computation program 1072 specified in step S10020 to determine whether the I/O size of the processing target write command is less than the threshold (S10060), and if the I/O size of the processing target write command is determined to be less than the threshold (less than the threshold), [the CPU 40A] moves to step S10070, and if the I/O size of the processing target write command is determined to be equal to or more than the threshold, moves to step S10080.

The CPU 40A implements memory bus optimization execution processing of the remote copy function (processing shown in FIG. 5) in step S10070 and carries out cache poisoning optimization execution processing of the remote copy function (processing shown in FIG. 6) in step S10080 and ends the processing of this routine (S10090).

With this Example, at the stage where the remote copy is implemented, if the access target volume is a volume to which the synchronous remote copy is applied, which is an attribute with which a remote copy is applied, the CPU 40A selects memory bus optimization execution processing on condition that the I/O size of the processing target write command is less than the threshold, sequentially caches user data 511 of the authentication unit 501 which is stored in the CPU memory 50A in the CPU cache 42A, sequentially loads the user data 511 of the authentication unit 501, which was cached in the CPU cache 42A, into the CPU core 41A, and as a result of the CPU core 41A continuously executing the processing to check the apparatus internal authentication code (S11400) and the processing to append the inter-apparatus authentication code to the user data (S11600), the frequency with which the user data passes through the CPU memory bus 100 can be reduced and, as a result, the CPU cache hit rate can be raised and the I/O processing performance can be improved.

Moreover, with this Example, at the stage where remote copying is implemented, if the access target volume is a volume to which a synchronous remote copy is applied, which is an attribute for applying a remote copy, the CPU 40A selects the cache poisoning optimization execution processing on condition that the I/O size of the processing target write command is equal to or more than the threshold, and selects the cache poisoning optimization execution processing on condition that the access target volume is a volume to which an asynchronous remote copy is applied, which is an attribute for applying a remote copy, stores the user data 511 of the authentication unit 501 and the user data of the inter-apparatus authentication code 502 respectively in the temporary area 43A of the CPU cache 42A from the CPU memory 50A without caching the user data in the main storage area of the CPU cache 42A and, by loading each of the user data stored in the temporary area 43A into the respective CPU cores 41A, it is possible to prevent the main storage area of the CPU cache 42A from being poisoned by the user data and, as a result, the CPU cache hit rate can be raised and the I/O processing performance can be improved.

Second Example

The computer system according to this Example is a computer system to which an inline compression function is applied to the storage apparatus 10, wherein, except for comprising an inline compression function, the remaining configuration is the same as that of the First Example. Here, the CPU memory 50 stores information relating to a microprogram and a table which are different from the First Example.

Figure 8:
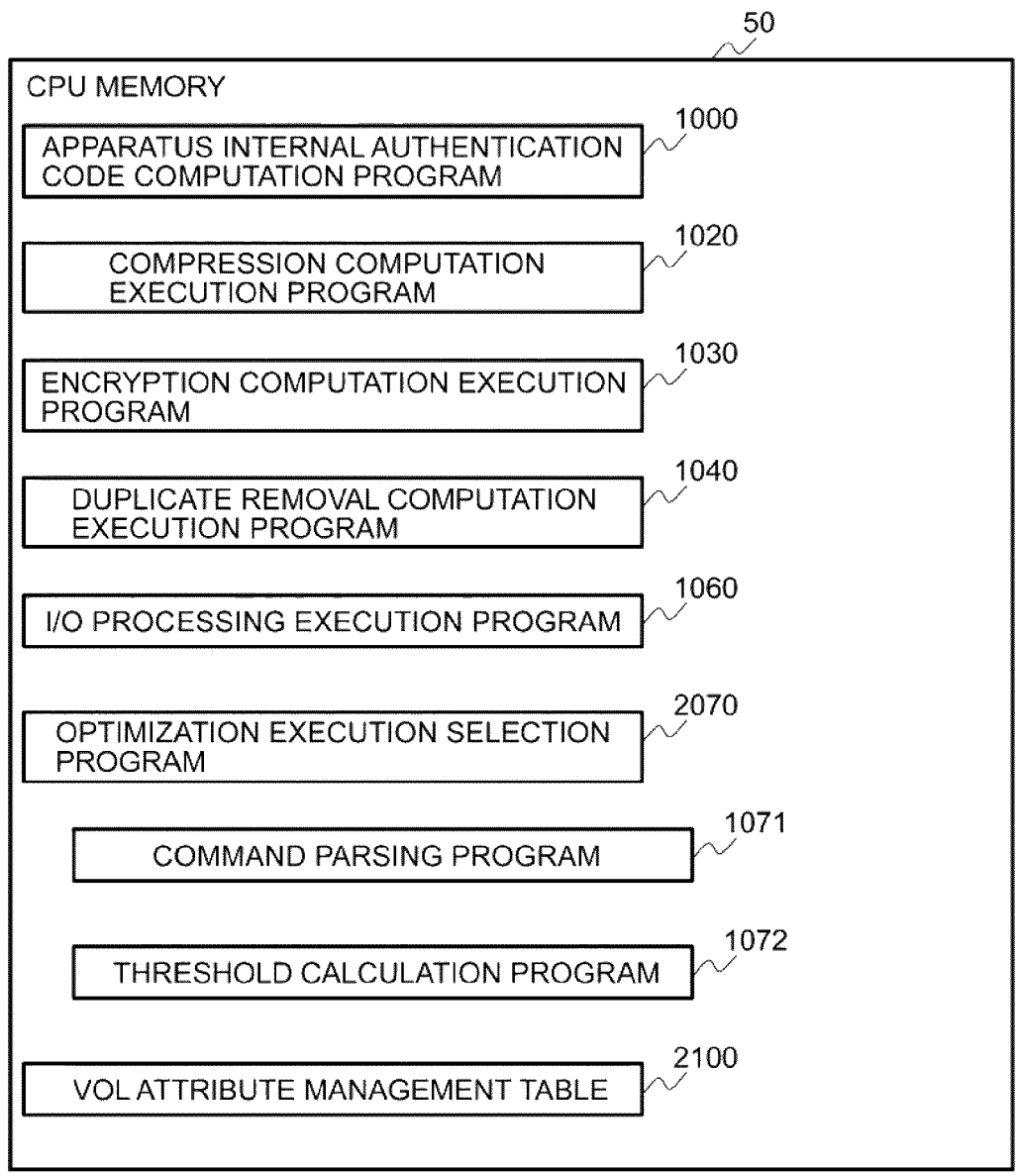
FIG. 8 is a configuration diagram of a CPU memory according to a second example.

FIG. 8 is a configuration diagram of a CPU memory according to the Second Example. The CPU memory 50 stores, as microprograms which are similar to those of the First Example, an apparatus internal authentication code computation program 1000, an I/O processing execution program 1060, a command parsing program 1071, and a threshold computation program 1072, and as microprograms which are different from those of the First Example, an optimization execution selection program 2070, and as new microprograms, a compression computation execution program 1020, an encryption computation execution program 1030, and a duplicate removal computation execution program 1040, and as a table which is different from that of the First Example, a VOL attribute management table 2100.

The compression computation execution program 1020 is a program which enables the CPU 40 to execute computation to reduce the amount of data of the user data while still preserving the content of the user data. As a result of the CPU 40 executing the compression computation execution program 1020, the amount of data stored in the storage device 70 can be reduced.

Compression computation is computation to define the size of the user data, which is called a compression unit, and to reduce the data amount for all the user data contained in the compression unit. If the user data which is updated by the write processing exists when the CPU 40 executes the compression computation, compression computation is executed after the CPU 40 reads the user data which has not been updated from the storage device 70 and archives the read user data. Further, the compression computation is executed starting with, among the user data contained in the compression unit, user data with smaller address values followed by user data with progressively larger address values.

The encryption computation execution program 1030 is a program enabling the CPU 40 to encrypt the user data.

The duplicate removal computation execution program 1040 is a program enabling the CPU 40 to exclude the computation of data which is duplicated at the stage where the user data is processed. Note that, although the processing in which the compression computation execution program 1020 is used has been described in this Example, the encryption computation execution program 1030 and the duplicate removal computation execution program 1040 may also be used instead of the compression computation execution program 1020.

The optimization execution selection program 2070 is a program enabling the controller 11 to select either the memory bus optimization execution processing or the cache poisoning optimization execution processing when executing the I/O processing for the volume (VOL) to which the inline compression function is applied. Here, the optimization execution selection program 2070 can be used as a program which enables the controller 11, at the stage where I/O processing is executed, to perform command parsing or table referencing, specify the attribute of the access target volume, and select either the memory bus optimization execution processing or the cache poisoning optimization execution processing on the basis of the specified volume attribute.

The VOL attribute management table 2100 is a table enabling the controller 11 to manage the attributes (volume attributes) applied to the access target volumes (VOL).

FIG. 9 is a configuration diagram of a VOL attribute management table. In FIG. 9, the VOL attribute management table 2100 is a table for managing whether the inline compression function is applied to each volume (VOL) 71 and compression units of the inline compression function and which the CPU 40 references during the optimization execution selection processing. The VOL attribute management table 2100 is configured from a VOL number column 2101, an inline compression column 2102, and a compression unit column 2103.

The VOL number column 2101 stores VOL numbers enabling the CPU 40 to identify the volume 71 which is accessed in the I/O processing. The inline compression column 2102 stores information relating to whether the inline compression function is applied to each volume 71. For example, if the inline compression function is applied to a volume 71, "○" is stored [in the inline compression column 2102]. The compression unit column 2103 stores "32 KB", for example, as information indicating the compression unit if the inline compression function is applied to the volume 71.

Figure 10:
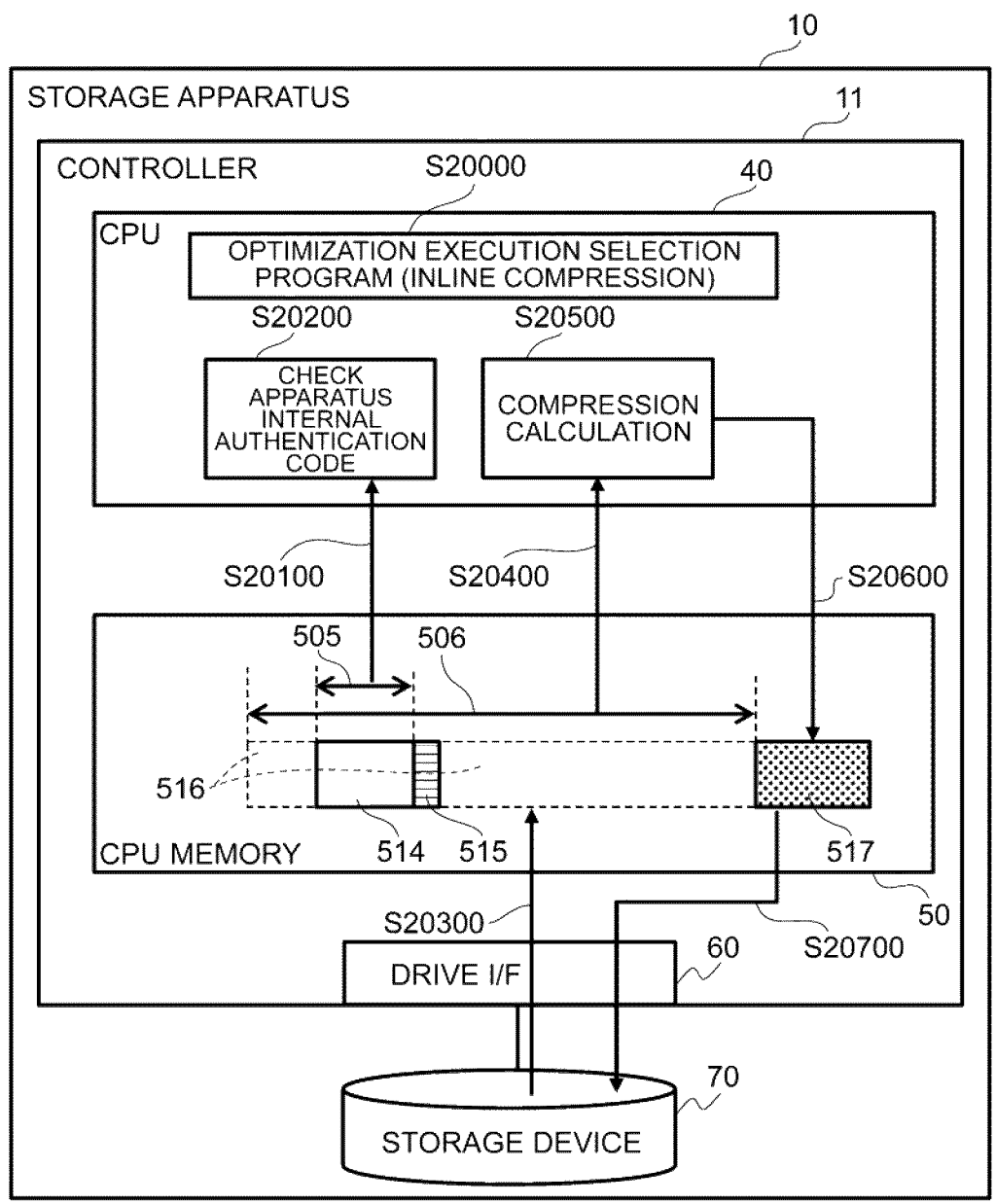
FIG. 10 is an explanatory diagram serving to illustrate an inline compression function according to the second example.

FIG. 10 is an explanatory diagram serving to illustrate the inline compression function. This processing is started as a result of the CPU 40 executing the I/O processing execution program 1060.

First, upon receiving a write command from the host computer 20, the CPU 40 calls the optimization execution selection program 2070 and performs inline compression optimization execution selection processing (S20000). Thereafter, the CPU 40 executes processing similar to the processing of steps S11000, S11100, and S11200 in FIG. 4.

The CPU 40 subsequently loads the user data 514 of the size of the authentication unit 505 and the apparatus internal authentication code 515 into the CPU core 41 from the CPU memory 50 in order to check the apparatus internal authentication code (S20100).

The CPU core 41 then calls the apparatus internal authentication code computation program 1000, computes the apparatus internal authentication code of the user data 514, compares the computation result with the apparatus internal authentication code 515 appended to the user data 514 by the protocol chip 32, and checks whether data corruption has occurred (S20200). Thereupon, the CPU core 41A executes user data compression computation after determining that data corruption has not occurred.

If user data 516 which has not been updated by the write processing exists in the user data contained in the compression unit 506, the drive I/F 60 then reads the user data 516 which has not been updated by the write processing from the storage device 70 and stores the read user data 516 in the CPU memory 50 (S20300). Thereupon, if the user data stored in the storage device 70 is compressed user data, the CPU 40 or the drive I/F 60 decompresses the compressed user data and stores the decompressed user data in the CPU memory 50.

The CPU 40 subsequently loads the user data 516 of the size of the compression unit 506 stored in the CPU memory 50 in step S20300 into the CPU core 41 (S20400).

The CPU core 41 then calls the compression computation program 1020 and executes compression computation for compressing the user data 516 of the size of the compression unit 506 (S20500).

Thereafter, the CPU core 41 stores the compressed user data 517 computed in step S20500 in the CPU memory 50 (S20600). Here, the area of the user data stored in the CPU memory 50 may be any area of the CPU memory 50.

The drive I/F 60 then stores the compressed user data 517 stored in the CPU memory 50 in the storage device 70 (S20700) and ends the processing. As a result, the CPU 40 is able to compress the user data 516 of the compression unit 506 at the stage where I/O processing is executed without data corruption occurring.

Figure 11:
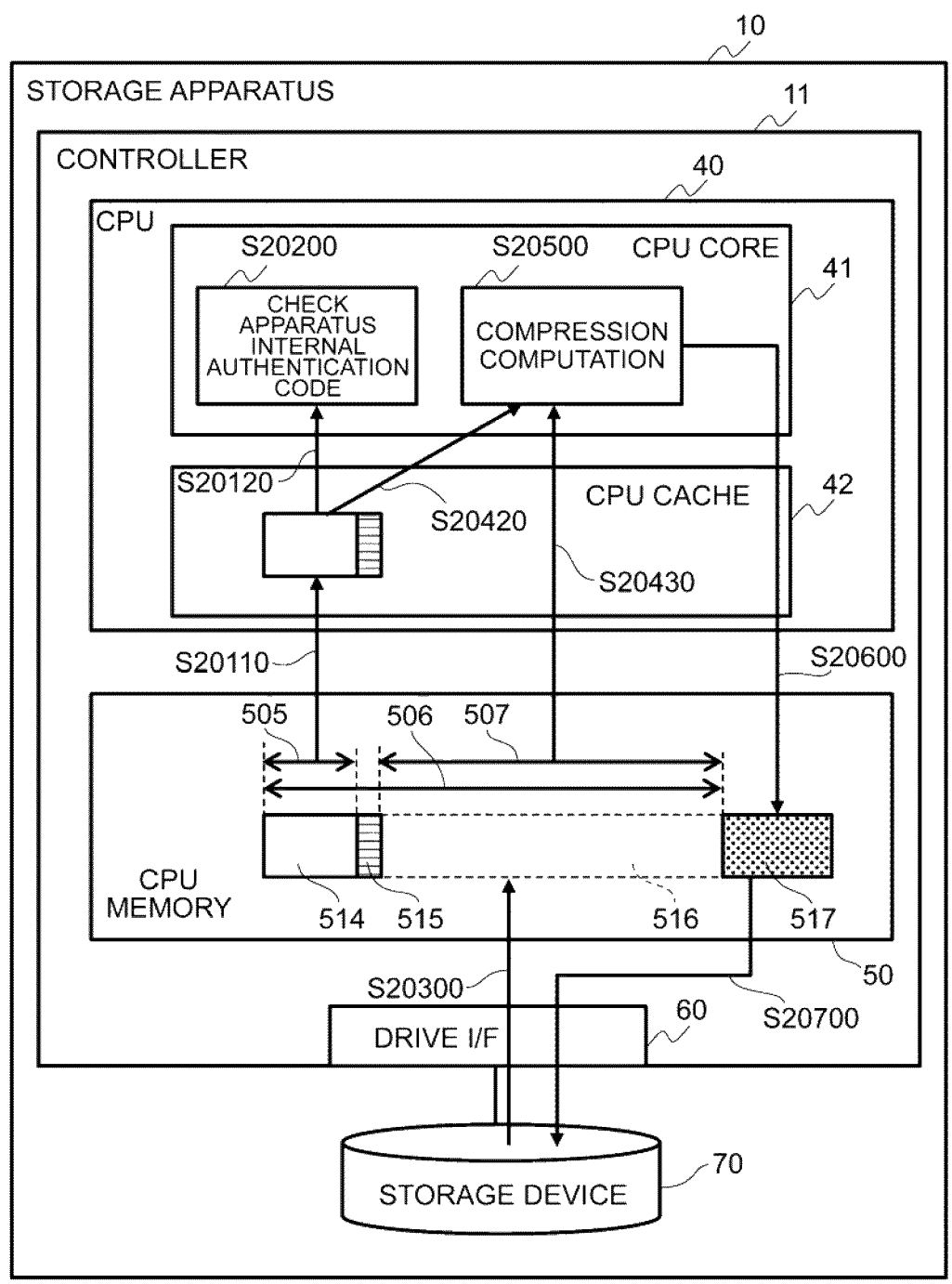
FIG. 11 is an explanatory diagram serving to illustrate memory bus optimization execution processing according to the second example.

FIG. 11 is an explanatory diagram serving to illustrate the memory bus optimization execution processing of the inline compression function. This processing is started as a result of the CPU 40 executing the I/O processing execution program 1060. The memory bus optimization execution processing of the inline compression function caches the user data 514 of the authentication unit 505 in the CPU cache 42 in cases where the start address of the update target user data 514 matches the start address of the user data of the compression unit 506 which is user data including the update target user data 514, and, by continuously executing processing to check the apparatus internal authentication code based on the cached user data 514 and compression computation processing to compress the user data of the compression unit 506, the frequency with which the update target user data 514 passes through the CPU memory bus 100 can be reduced.

First, under the condition that user data is stored in the CPU memory 50, the CPU 40 caches, among the update target user data stored in the CPU memory 50, the user data 514 of the size of the authentication unit 505 and the apparatus internal authentication code 515, in the CPU cache 42 (S20110).

The CPU 40 subsequently loads the user data 514 and the apparatus internal authentication code 515 which were cached in the CPU cache 42 in step S20110 into the CPU core 41 (S20120).

The CPU core 41 subsequently calls the apparatus internal authentication code 1000, computes the apparatus internal authentication code on the basis of the user data 514, compares the computation result with the apparatus internal authentication code 515 appended to the user data 514 by the protocol chip 32, and checks whether data corruption has occurred (S20200).

The CPU 40 then loads the user data 514 which is cached in the CPU cache 42 in step S20110 into the CPU core 41 (S20420). Here, the CPU core 41 into which the user data 514 is loaded may be the same as the CPU core 41 into which the user data 514 was loaded in step S20120 or may be a different CPU core.

The CPU 41 then calls the compression computation program 1020 and executes computation compression for the user data 514 loaded from the CPU cache 42 in step S2042 (S20500). At the stage of the compression computation processing, the CPU core 41 temporarily holds an intermediate result obtained by executing compression computation.

If user data 516 which has not been updated by the write processing exists among the user data contained in the compression unit 506, the drive I/F 60 subsequently reads the user data 516 which has not been updated by the write processing from the storage device 70 and stores the read user data 516 in the CPU memory 50 (S20300).

The CPU 40 subsequently loads the user data 516 of the data length 507 which is the user data that was stored in the CPU memory 50 in step S20300 into the CPU core 41 while minimizing poisoning of the CPU cache 42 (S20430).

The CPU core 41 calls the compression computation program 1020 and executes compression computation for the user data 516 which was loaded from the CPU cache 42 in step S20430 (S20500). At the stage of the compression computation processing, the CPU core 41 generates compressed user data 517 by collecting the held intermediate result and the current compression computation result and stores the generated compressed user data 517 in the CPU memory 50 (S20600). Here, the area of the user data stored in the CPU memory 50 may be any area of the CPU memory 50.

Thereafter, the drive I/F 60 stores the compressed user data 517 stored in the CPU memory 50 in the storage device 70 (S20700) and ends the processing. Accordingly, the CPU 40 is able to compress the user data 514, 516 of the compression unit 506 at the stage of executing I/O processing without data corruption occurring.

In cases where the processing to check the apparatus internal authentication code (S20200) and compression computation processing (S20500) are executed, the CPU 40 selects the memory bus optimization execution processing, caches the user data 514 of the authentication unit 505 in the CPU cache 42 from the CPU memory 50, loads the user data 511 of the authentication unit 501 which was cached in the CPU cache 42 into the CPU core 41, loads the user data 516 of the compression unit 506 from the CPU memory 50 to the CPU core 41 and, as a result of the CPU core 41 continuously executing the processing to check the apparatus internal authentication code (S20200) and the compression computation processing (S20500) on the basis of the loaded user data, the frequency with which the user data passes through the CPU memory bus 100 can be reduced and the I/O processing performance can be improved.

Figure 12:
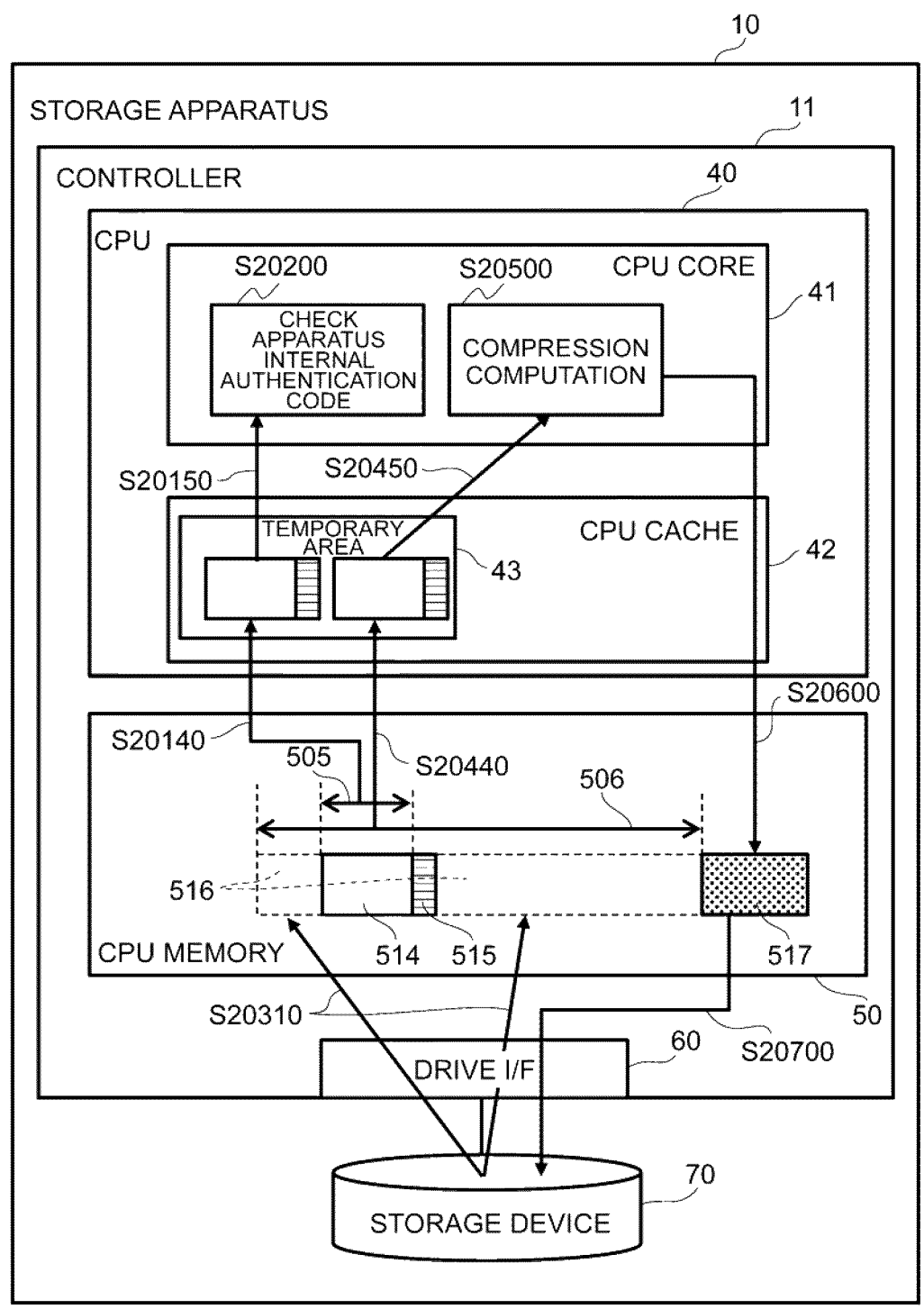
FIG. 12 is an explanatory diagram serving to illustrate cache poisoning optimization execution processing according to the second example.

FIG. 12 is an explanatory diagram serving to illustrate the cache poisoning optimization execution processing of the inline compression function. In FIG. 12, in the cache poisoning optimization execution processing of the inline compression function, if the start address of the update target user data 514 does not match the start address of the user data 516 of the compression unit 506 which is user data including the update target user data 514, compression computation must be executed after waiting for the user data 516 which has not been updated, which is user data in the compression unit 506, to be read from the storage device 70. Therefore, the processing to check the apparatus internal authentication code (S20200) and the compression computation processing (S20500) are each executed with different timing. Here, in the respective processing, by loading the user data of the CPU memory 50 into the CPU core 41 while minimizing poisoning of the CPU cache 42, the amount of poisoning of the CPU cache 42 can be suppressed.

First, on condition that the update target user data is stored in the CPU memory 50, the CPU 40 stores, among the update target user data stored in the CPU memory 50, the user data 514 of the size of the authentication unit 505 of the apparatus internal authentication code and the apparatus internal authentication code 515 appended by the protocol chip 32 in the temporary area 43 which is not used for caching in the CPU cache 42. Poisoning of the CPU cache 42 can thus be kept to a minimum.

The CPU 40 subsequently loads the user data 514 and the apparatus internal authentication code 515 which were stored in the temporary area 43 in step S20140 into the CPU core 41 (C20150).

The CPU core 41 subsequently calls the apparatus internal authentication code computation program 1000 and executes an apparatus internal authentication code check for the user data 514 loaded in step S20140 (S20200).

If user data 516 which has not been updated by the write processing exists in the user data contained in the compression unit 506, the drive I/F 60 subsequently reads the user data 516 which has not been updated by the write processing from the storage device 70 and stores the read user data 516 in the CPU memory 50 (S20310).

The CPU 40 then stores the user data 516 of the size of the compression unit 506 in the temporary area 43 of the CPU cache 42 (S20440) and loads the user data (user data including the user data 514) 516 which is stored in the temporary area 43 into the CPU core 41 (S20450).

The CPU core 41 calls the compression computation program 1020, executes compression computation for the user data 516 which was loaded from the temporary area 43 of the CPU cache 42 in step S20450 (S20500), and stores the compressed user data 517 obtained in the compression computation in the CPU memory 50 (S20600). Here, the area of the user data stored in the CPU memory 50 may be any area of the CPU memory 50.

Thereafter, the drive I/F 60 stores the compressed user data 517 which is stored in the CPU memory 50 in the storage device 70 (S20700) and ends the processing. As a result, the CPU 40 is able to compress the user data 516 of the compression unit 506 at the stage where the I/O processing is executed without data corruption occurring.

If the CPU core 41A executes the processing to check the apparatus internal authentication code (S20200) and the compression computation processing (S20500) separately, the CPU 40 selects the cache poisoning optimization execution processing and stores the user data 514 of the authentication unit 505 and the user data 516 of the compression unit 506 in the temporary area 43 of the CPU cache 42 with different timing from the CPU memory 50 without caching the user data in the main storage area of the CPU cache 42, and, by loading each of the user data stored in the temporary area 43 in the CPU core 41 with different timing, it is possible to prevent the main storage area of the CPU cache 42 from being poisoned by the user data and to improve the I/O processing performance.

Figure 13:
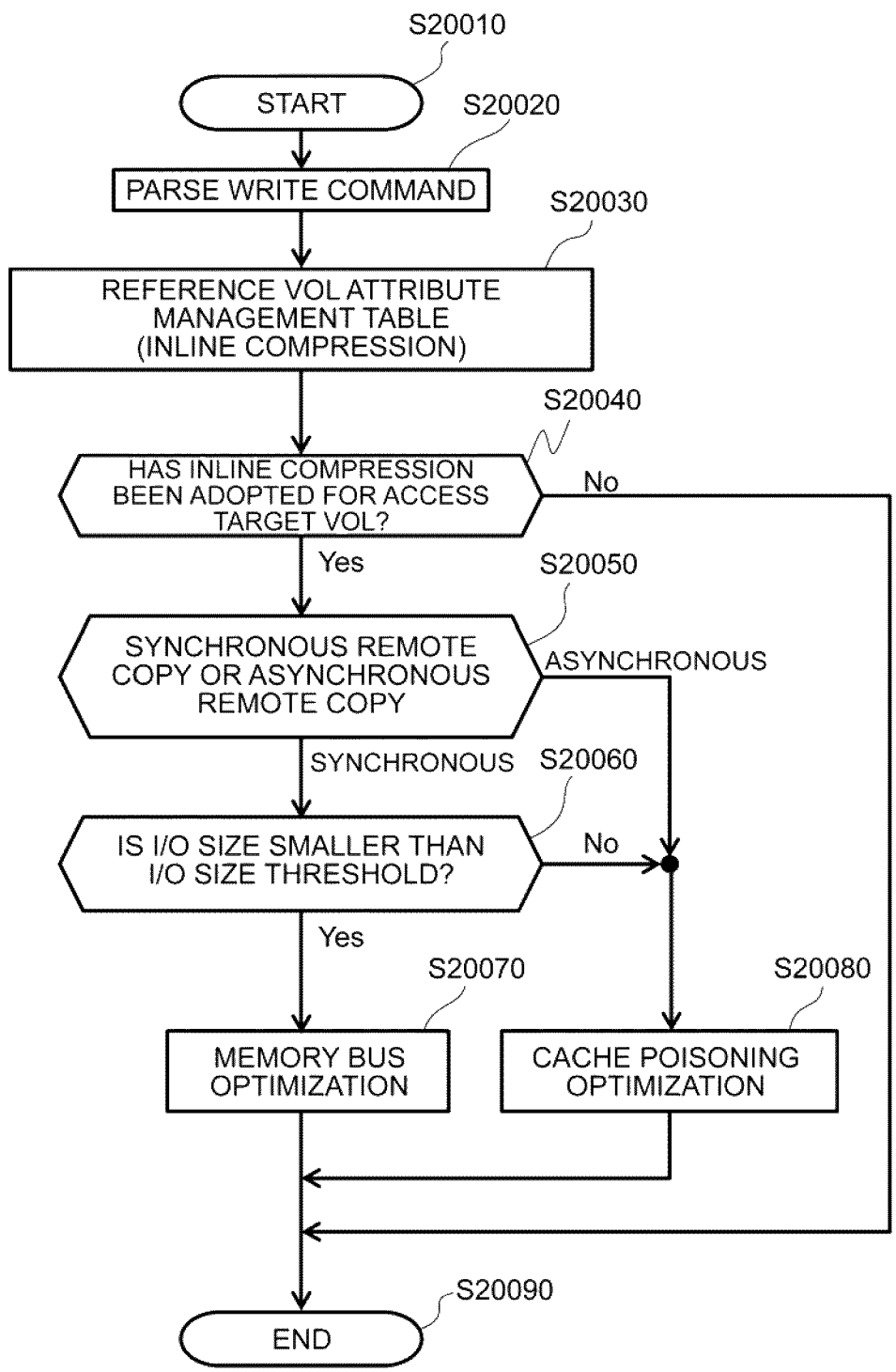
FIG. 13 is a flowchart showing processing to select optimization execution processing according to the second example.

FIG. 13 is a flowchart serving to illustrate inline compression function optimization execution selection processing. In FIG. 13, this processing is executed each time the storage apparatus 10 receives a write request from the host computer 20. Here, write command parsing, referencing of the VOL attribute management table 2100, and processing to compare the I/O size with the threshold are executed, and processing to select either the memory bus optimization execution processing or the cache poisoning optimization execution processing based on the volume attribute is executed.

First, if a write command request is received from the host computer 20, the CPU 40 starts the inline compression optimization execution selection processing (S20010). The CPU 40 parses the write command (write request) issued to the storage apparatus 10 from the host computer 20 and specifies the access target VOL number and the address and I/O size of the access target volume 71 on the basis of the parsing result (S20020).

The CPU 40 then references the VOL attribute management table 20100 and, taking the access target VOL number specified in step S20020 as a key, acquires information indicating the existence of the inline compression function applied to the volume 71 corresponding to the access target VOL number and information indicating the compression unit set for the volume 71 corresponding to the access target VOL number if the inline compression function has been applied to the volume 71 corresponding to the VOL number (S20030).

The CPU 40 then determines whether the inline compression function has been applied to the access target volume 71 on the basis of the information obtained by referencing the VOL attribute management table 2100 in step S20030 (S20040), and if an affirmative determination result is obtained in this step, moves to step S20050, and if a negative result is obtained in step S20040, moves to step S20090 and ends the processing of this routine.

If the inline compression function has been applied to the access target volume 71, the CPU 40 determines whether the address for writing the user data specified by write command parsing of step S20020 and the start address of the compression unit have been arranged (S20050). That is, the CPU 40 determines whether the start address indicating the access destination for writing the user data matches the start address indicating the access destination for accessing the user data of the compression unit. Here, it can be determined whether the start addresses match by determining whether the write command is a multiple of the compression unit of the volume specified in step S20020, for example.

If an affirmative determination result is obtained in step S20050, the CPU 40 moves to step S20060, and if a negative determination result is obtained in step S20050, the CPU 40 moves to step S20080.

In step S20060, the CPU 40 compares the I/O size specified in step S20020 with a threshold which is computed using the threshold computation program 1072, and if the I/O size specified by the processing target write command is less than the threshold, the CPU 40 moves to the processing of step S20070, and if the I/O size specified by the processing target write command is equal to or more than the threshold, moves to the processing of step S20080.

In step S20070, the CPU 40 implements the memory bus optimization execution processing of the inline compression function (the processing shown in FIG. 11), and in step S20080, implements the cache poisoning optimization execution processing (the processing in FIG. 12) of the inline compression function, and subsequently ends the inline compression optimization execution selection processing (S20090).

According to this Example, at the stage where write processing is executed, if the start address of the user data which is the write processing target for which the volume attribute is inline compression matches the start address of the user data of the compression unit, on condition that the I/O size specified by the write command is less than the threshold, [the CPU 40] selects memory bus optimization execution processing and, by continuously executing the processing to check the apparatus internal authentication code (S20200) and the compression computation processing (S20500), the frequency with which the user data passes through the CPU memory bus 100 can be reduced and, as a result, the CPU cache hit rate can be raised and the I/O processing performance can be improved.

Furthermore, according to this Example, at the stage where write processing is executed, if the start address of the user data which is a write processing target for which the volume attribute is online compression matches the start address of the user data of the compression unit, on condition that the I/O size specified by the write command is equal to or more than the threshold, [the CPU 40] selects memory bus optimization execution processing, and on condition that the start address of the user data which is the write processing target for which the volume attribute is inline compression does not match the start address of the user data of the compression unit, [the CPU 40] selects the memory bus optimization execution processing and stores, with different timing, the user data 514 of the authentication unit 505 and the user data 516 of the compression unit 506 in the temporary area 43 of the CPU cache 42 from the CPU memory 50 without caching the user data in the main storage area of the CPU cache 42 and, by loading each of the user data stored in the temporary area 43 with different timing in the respective CPU core 41, it is possible to keep the main storage area of the CPU cache 42 from being poisoned by the user data and, as a result, the CPU cache hit rate can be raised and the I/O processing performance can be improved.

Third Example

This Example is an example for a case where the storage apparatus 10 is used as unified storage. Here, unified storage is a storage apparatus which enables both block-access and file-access access methods.

The computer system according to this Example is a computer system in which the storage apparatus 10 is configured as unified storage and, except for the fact that the storage apparatus 10 is configured as unified storage, the remaining configuration is the same as the first Example. Here, the CPU memory 50 stores information relating to microprograms which are different from those of the First Example.

Figure 14:
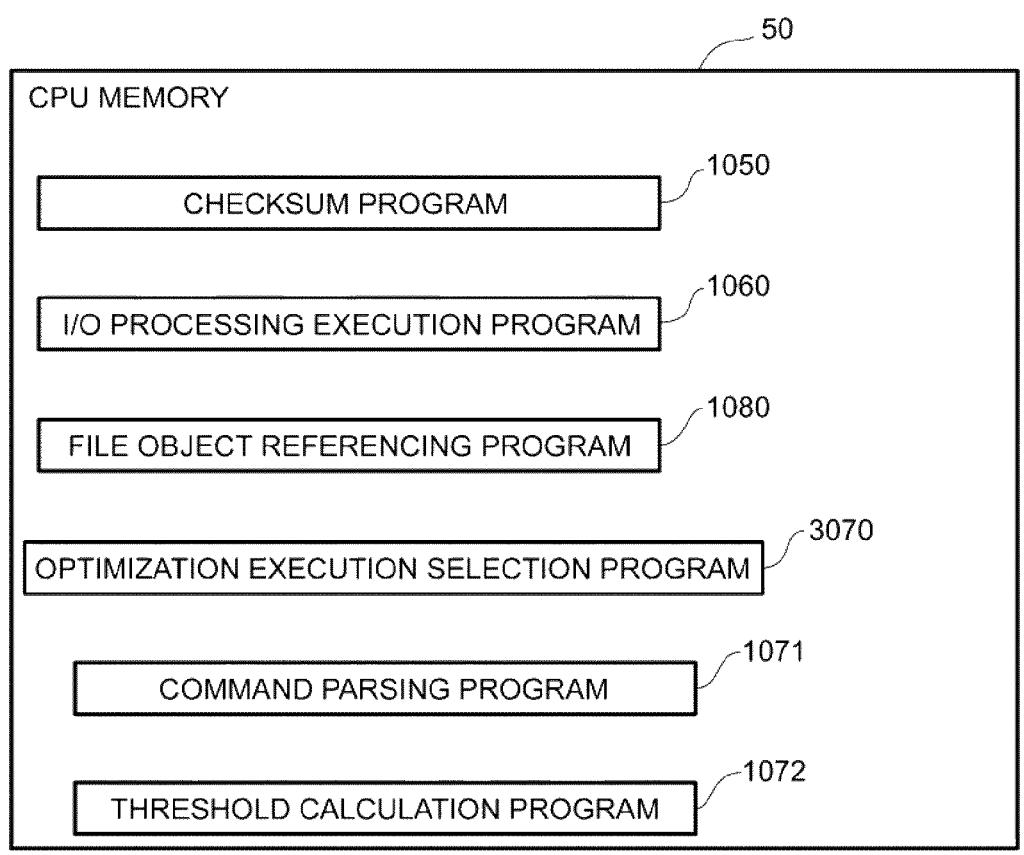
FIG. 14 is a configuration diagram of a CPU memory according to a third example.

FIG. 14 is a configuration diagram of the CPU memory according to this Example. In FIG. 14, the CPU memory 50 stores, as microprograms which are the same as those of the First Example, an I/O processing execution program 1060, a command analysis program 1071, and a threshold computation program 1072, and stores, as microprograms which are different from those of the First Example, a checksum program 1050, a file object referencing program 1080, and an optimization execution selection program 3070.

The checksum program 1050 is a program enabling the CPU 40 to execute processing to detect send/receive data known as a checksum, for example user data errors. When the CPU 40 extracts user data from the storage device 70 at the stage where read processing is executed, a checksum is executed for the extracted user data.

The file object referencing program 1080 is a program which is used to enable the CPU 40 to reference a file object on the basis of data called an i-node.

The optimization execution selection program 3070 is a program enabling the CPU 40 to select either memory bus optimization execution processing or cache poisoning optimization execution processing according to the user data when the I/O processing of the volume (VOL) is executed.

Figure 15:
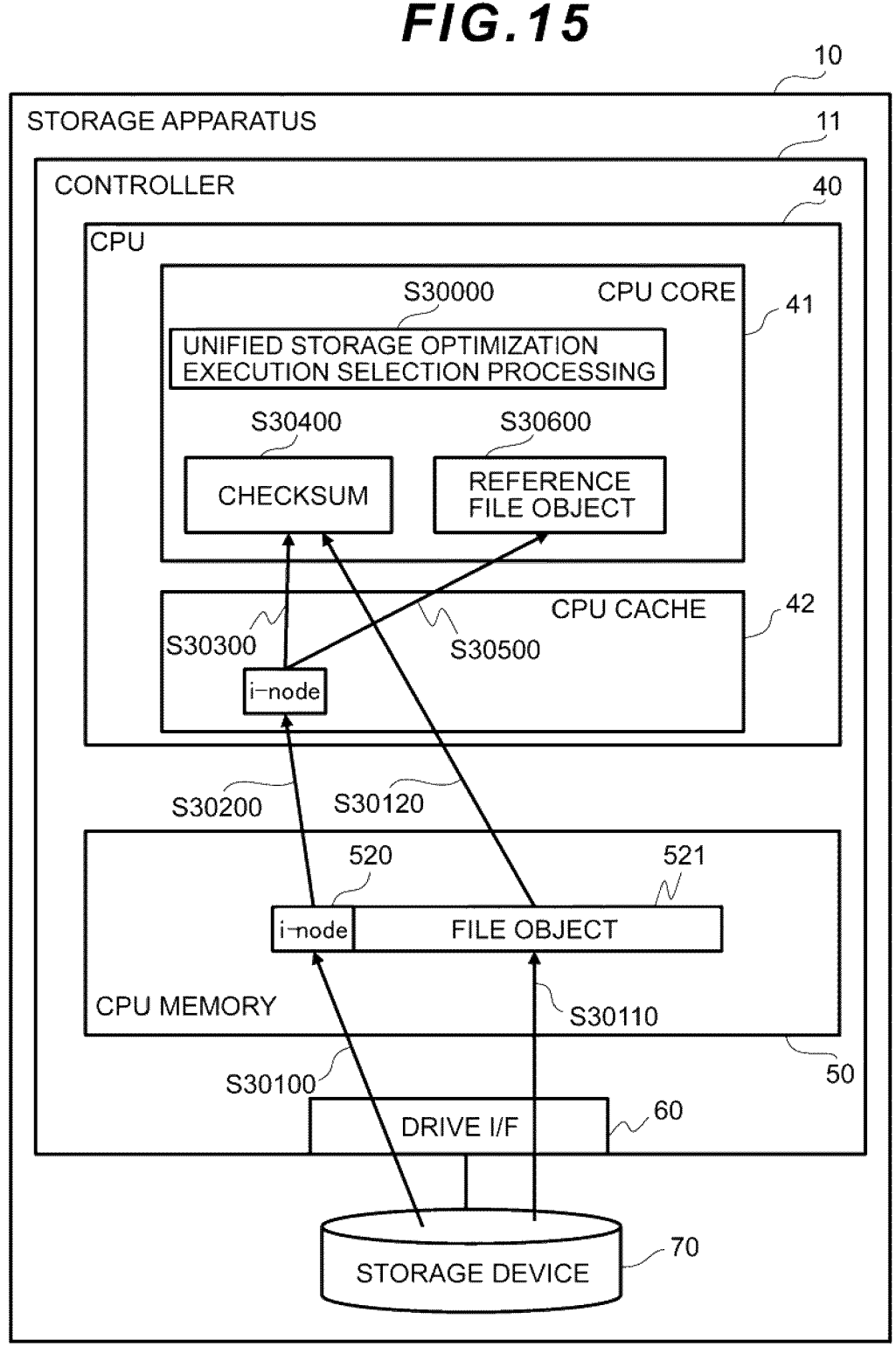
FIG. 15 is an explanatory diagram serving to illustrate memory bus optimization execution processing according to the third example.

FIG. 15 is an explanatory diagram serving to illustrate memory bus optimization execution processing of unified storage. In FIG. 15, the memory bus optimization execution processing of the unified storage is started as a result of the CPU 40 executing the I/O processing execution program 1060.

First, the CPU 40 calls the optimization execution selection program 3070 at the point where a read command is received from the host computer 20 and implements unified storage optimization execution selection processing (S30000). Upon determining that the user data extracted from the storage device 70 is an i-node on the basis of the read command, the CPU 40 caches the i-node in the CPU cache 42, whereby the frequency with which the user data passes through the CPU memory bus 100 can be reduced.

Here, if the user data extracted from the storage device 70 is an i-node, the CPU 40 executes the processing of steps S30100, S30200, S30300, S30400, S30500, S30600, and S30700 as the processing of the memory bus optimization execution processing of the unified storage.

First, if the user data is an i-node, the drive I/F 60 extracts an i-node 520 from the storage device 70 (S30100).

The CPU 40 then caches the i-node 520, which was stored in the CPU memory 50, in the CPU cache 42 (S30200) and loads the i-node 520 stored in the CPU cache 42 into the CPU core 41 (S30330).

The CPU core 41 then calls the checksum program 1050 and uses the checksum program 1050 to check whether data corruption has occurred for the i-node 520 (S30400).

Thereafter, if it is determined that data corruption has not occurred for the i-node 520, the CPU core 41 then loads the i-node 520 stored in the CPU cache 42 into the CPU core 41 (S30500).

The CPU core 41 then calls the file object referencing program 1080 and uses the file object referencing program 1080 to specify the file object 521 managed by the i-node 520 (S30600).

The drive I/F 60 subsequently extracts the file object 521 which was specified in step S30600 from the storage device 70 and stores the file object 521 in the CPU memory 50 (S30100).

The CPU 40 subsequently loads the file object 521 stored in the CPU memory 50 into the CPU core 41 (S30120). Thereafter, the CPU core 41 calls the checksum program 1050 and uses the checksum program 1050 to check whether data corruption has not occurred for the file object 521 (S30400).

As the I/O processing of the volume 71, at the stage where read processing is executed, if it is determined that the user data which was extracted from the storage device 70 is an i-node on the basis of the read command, the CPU 40 adopts the memory bus optimization execution processing and caches the i-node 520 in the CPU cache 42 and, because the checksum processing (S30400) and the file object referencing processing (S30600) can be continuously executed, it is possible to reduce the frequency with which the user data passes through the CPU memory bus 100.

Figure 16:
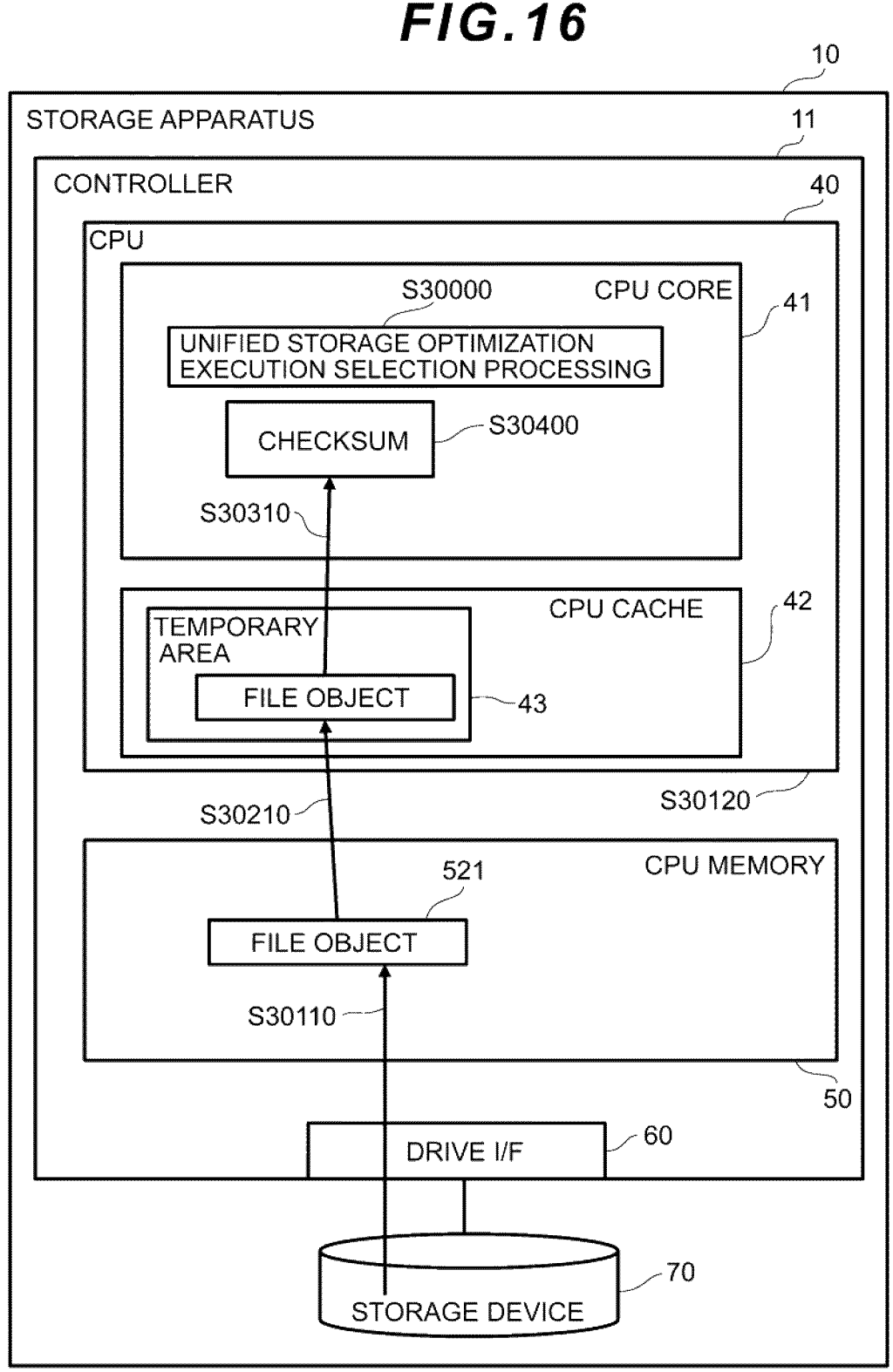
FIG. 16 is an explanatory diagram serving to illustrate cache poisoning optimization execution processing according to the third example.

FIG. 16 is an explanatory diagram serving to illustrate the cache poisoning optimization execution processing of the unified storage. In FIG. 16, in the cache poisoning optimization execution processing of the unified storage, in a case where the user data extracted from the storage device 70 is a file object, the CPU 40 is able to execute only a checksum and load the i-node into the CPU core 41 while suppressing poisoning of the CPU cache 42 without referencing the file object once again. As cache poisoning optimization execution processing of the unified storage, the processing of steps S30110, S30210, S30310, and S30400 is executed.

First, in a case where the user data is a file object, the drive I/F 60 extracts the file object 521 from the storage device 70 and stores the file object 521 in the CPU memory 50 (S30110).

Thereafter, the CPU 40 stores the file object 521 which was stored in the CPU memory 50 in the temporary area 43 which is within the CPU cache 42 and is not being used for caching (S30210).

The CPU 40 subsequently loads the file object 521 stored in the temporary area 43 into the CPU core 41 (S30310).

Thereafter, the CPU core 41 calls the checksum program 1050 and uses the checksum program 1050 to check whether data corruption has not occurred for the file object 521 (S30400).

At the stage where read processing is executed, in a case where it is determined that the user data which was extracted from the storage device 70 is a file object on the basis of the read command, the CPU 40 selects the cache poisoning optimization execution processing, stores the file object 521 stored in the CPU memory 50 in the temporary area 43 of the CPU cache 42, and by loading the file object 521 which was stored in the temporary area 43 into the CPU core 41 and executing only a checksum, the file object 521 can be loaded into the CPU core 41 while suppressing poisoning of the CPU cache 42 without referencing the file object 521 once again.

Figure 17:
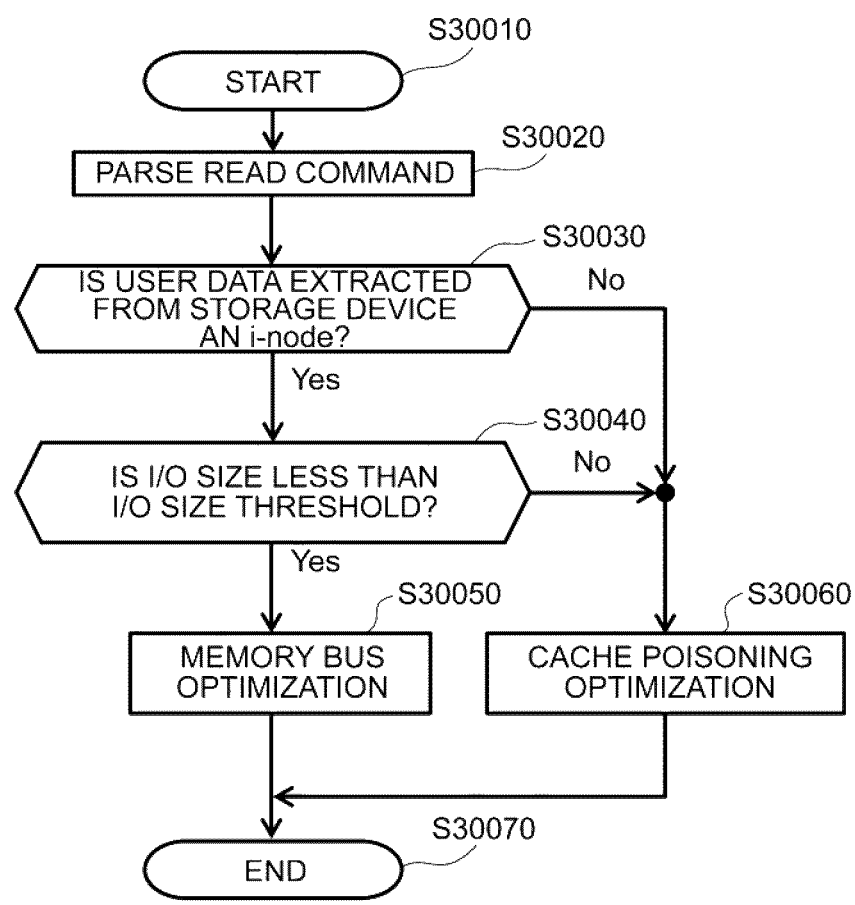
FIG. 17 is a flowchart showing processing serving to illustrate optimization execution processing according to the third example.

FIG. 17 is a flowchart serving to illustrate the optimization execution selection processing of unified storage. This processing is started as a result of the CPU 40 executing the unified storage optimization selection processing (S30010).

The CPU 40 parses a read command which is issued to the storage apparatus 10 from the host computer 20 and specifies the address and I/O size of the access target volume (S30020).

Based on the parsing result, the CPU 40 then determines whether the user data extracted from the storage device 70 which is the access target user data is an i-node on the basis of the address of the access target volume (S30030), and if an affirmative determination result is obtained in this step, that is, if the user data is an i-node, the CPU 40 moves to the processing of step S30040, and if a negative determination result is obtained in step S30030, that is, if the user data is not an i-node and is a file object, the CPU 40 moves to the processing of step S30060.

The CPU 40 compares the I/O size with the threshold computed by the threshold computation program 1072 in step S30040 and determines whether the I/O size is less than the threshold, and if an affirmative determination result is obtained in step S30040, moves to the processing of step S30050, and if a negative determination result is obtained in step S30040, moves to the processing of step S30060.

The CPU 40 implements the memory bus optimization execution processing of the unified storage (the processing in FIG. 15) in step S30050 and, in step S30060, implements the cache poisoning optimization execution processing of the unified storage (the processing in FIG. 16), and then ends the unified storage optimization execution selection processing (S30070).

According to this Example, at the stage where read processing is executed, if the user data extracted from the storage device 70 is an i-node on the basis of the read command, [the CPU 40] selects the memory bus optimization execution processing and caches the i-node 520 in the CPU cache 42, and by continuously executing the checksum processing (S30400) and the file object referencing processing (S30600), it is possible to reduce the frequency with which the user data passes through the CPU memory bus 100 and, as a result, the CPU cache hit rate can be raised and the I/O processing performance can be improved.

Furthermore, according to this Example, if the user data extracted from the storage device 70 is a file object, [the CPU 40] selects the cache poisoning optimization execution processing and stores the file object 521 stored in the CPU memory 50 in the temporary area 43 of the CPU cache 42, and by loading the file object 521 stored in the temporary area 43 into the CPU core 41 and executing only a checksum, the file object 521 can be loaded into the CPU core 41 while preventing poisoning of the CPU cache 42 without referencing the file object 521 once again.

Note that the present invention is not limited to the above Examples, rather, the present invention encompasses various modifications. For example, although the above Examples were described in detail in order to make the present invention easy to understand, the present invention is not necessarily limited to comprising all the described configurations. Furthermore, some of the configurations of a certain Example can be replaced with the configurations of another Example. In addition, other configurations can be added, eliminated, or may replace some of the configurations of each Example.

In addition, each of the foregoing configurations, functions, and processing and so on may also be implemented using hardware by designing some or all of the configurations, functions and processing by means of an integrated circuit, for example. Further, each of the foregoing configurations and functions and so on may be implemented by software as a result of a processor parsing and executing a program which implements the respective functions. Information such as programs, tables, and files which implement each of the functions can be recorded on a recording device such as a memory, hard disk, and SSD (Solid State Drive) or a recording medium such as an IC (Integrated Circuit) card, an SD (Secure Digital) memory card, or a DVD (Digital Versatile Disc).

REFERENCE SIGNS LIST

10 Storage apparatus
20 Host computer
30 Host I/F
40 CPU
41 CPU core
42 CPU cache
50 CPU memory
60 Drive I/F
70 Storage device
71 Volume
100 CPU memory bus

The invention claimed is:

1. A storage apparatus, comprising:
one or two or more storage devices in which a plurality of volumes are constructed in a storage area; and
a controller which specifies an access target volume among the plurality of volumes on the basis of an access request from an access request source, and executes data I/O processing on the specified access target volume,
wherein the controller comprises a CPU which executes arithmetic processing and a CPU memory which is connected to the CPU via a CPU memory bus,
wherein the CPU is configured from one or two or more CPU cores and a CPU cache which comprises a temporary area in a portion of a main storage area,
wherein the CPU discriminates an attribute of the access target volume or target data which is the target of the data I/O processing on the basis of the access request and selects memory bus optimization execution processing or cache poisoning optimization execution processing in accordance with the discrimination result,
wherein, if the memory bus optimization execution processing is selected, the CPU stores the target data among the data stored in the CPU memory in the main storage area of the CPU cache and loads the target data stored in the main storage area of the CPU cache into the CPU core,
wherein, if the cache poisoning optimization execution processing is selected, the CPU stores the target data among the data stored in the CPU memory in the temporary area of the CPU cache, and loads the target data stored in the temporary area of the CPU cache into the CPU core, and
wherein, if the target data is loaded from the main storage area of the CPU cache, the CPU core executes at least processing to check the target data loaded from the main storage area of the CPU cache, and if the target data is loaded from the temporary area of the CPU cache, executes processing to check the target data loaded from the temporary area of the CPU cache.

2. The storage apparatus according to claim 1,
wherein, if it is discriminated that the attribute of the access target volume is an attribute for which a synchronous remote copy is applied, the CPU specifies the I/O size required in the data I/O processing on the basis of the access request and, on condition that the specified I/O size is less than the threshold, the CPU selects the memory bus optimization execution processing, and on condition that the specified I/O size is equal to or more than the threshold, the CPU selects the cache poisoning optimization execution processing.

3. The storage apparatus according to claim 1,
wherein, if it is discriminated that the attribute of the access target volume is an attribute to which an asynchronous remote copy is applied, the CPU selects the cache poisoning optimization execution processing.

4. The storage apparatus according to claim 1,
wherein, if it is discriminated that the attribute of the access target volume is an attribute for which inline compression is applied, the CPU determines whether a start address of the target data among the data stored in the CPU memory matches a start address of the data of a compression unit which is the target of the inline compression among the data stored in the CPU memory, specifies the I/O size required in the data I/O processing on the basis of the access request if the two start addresses match, and on condition that the specified I/O size is less than the threshold, selects the memory bus optimization execution processing, and on condition that the specified I/O size is equal to or more than the threshold, selects the cache poisoning optimization execution processing.

5. The storage apparatus according to claim 1,
wherein, if it is discriminated that the attribute of the access target volume is an attribute for which inline compression is applied, the CPU discriminates whether the start address of the target data among the data stored in the CPU memory matches the start address of the data of the compression unit which is the target of the inline compression among the data stored in the CPU memory, and if the two start addresses do not match, selects the cache poisoning optimization execution processing.

6. The storage apparatus according to claim 1, wherein, if it is discriminated that the target data is an i-node, the CPU specifies the I/O size requested in the data I/O processing on the basis of the access request and, on condition that the specified I/O size is less than the threshold, the CPU selects the memory bus optimization execution processing, and on condition that the specified I/O size is equal to or more than the threshold, selects the cache poisoning optimization execution processing.

7. The storage apparatus according to claim 1, wherein, if it is discriminated that the target data is a file object, the CPU selects the cache poisoning optimization execution processing.

8. The storage apparatus according to claim 1, wherein, if the memory bus optimization execution processing is selected, the CPU stores the apparatus internal authentication code appended to the target data in the main storage area of the CPU cache and loads the apparatus internal target code stored in the main storage area of the CPU cache into the CPU core, and
wherein the CPU core continuously executes check processing in which the apparatus internal authentication code is generated from the target data loaded from the main storage area of the CPU cache and the apparatus internal authentication code is checked by comparing the generated apparatus internal authentication code with the apparatus internal target code loaded from the main storage area of the CPU cache, and append processing in which an inter-apparatus authentication code is generated from the target data loaded from the main storage area of the CPU cache, and the generated inter-apparatus authentication code is appended to the target data loaded from the main storage area of the CPU cache.

9. The storage apparatus according to claim 1, wherein, if the cache poisoning optimization execution processing is selected, the CPU stores the apparatus internal authentication code appended to the target data in a temporary area of the CPU cache and loads the apparatus internal authentication code stored in the temporary area of the CPU cache into the CPU core,
wherein the CPU core separately executes check processing in which the apparatus internal authentication code is generated from the target data loaded from the temporary area of the CPU cache and the apparatus internal authentication code is checked by comparing the generated apparatus internal authentication code with the apparatus internal target code loaded from the temporary area of the CPU cache, and append processing in which an inter-apparatus authentication code is generated from the target data loaded from the temporary area of the CPU cache, and the generated inter-apparatus authentication code is appended to the target data loaded from the temporary storage area of the CPU cache.

10. The storage apparatus according to claim 1, wherein, if the memory bus optimization execution processing is selected, the CPU stores the apparatus internal authentication code appended to the target data in the main storage area of the CPU cache from the CPU memory, stores data of a compression unit which is data including the target data in the main storage area of the CPU cache from the CPU memory, and loads the apparatus internal target code and the compression unit data which have been stored in the main storage area of the CPU cache into the CPU core,
wherein the CPU core continuously executes check processing in which an apparatus internal authentication code is generated from the target data loaded from the main storage area of the CPU cache and the apparatus internal authentication code is checked by comparing the generated apparatus internal authentication code with the apparatus internal target code loaded from the main storage area of the CPU cache, and compression processing in which the data of the compression unit loaded from the main storage area of the CPU cache is compressed.

11. The storage apparatus according to claim 1, wherein, if the cache poisoning optimization execution processing is selected, the CPU stores the apparatus internal authentication code appended to the target data in a temporary area of the CPU cache from the CPU memory, stores data of a compression unit which is data including the target data in the temporary area of the CPU cache from the CPU memory and loads the apparatus internal target code and the data of the compression unit which have been stored in the temporary area of the CPU cache into the CPU core,
wherein the CPU core separately executes check processing in which the apparatus internal authentication code is generated from the target data loaded from the temporary area of the CPU cache and the apparatus internal authentication code is checked by comparing the generated apparatus internal authentication code with the apparatus internal target code loaded from the temporary area of the CPU cache, and compression processing in which the compression unit data loaded from the temporary area of the CPU cache is compressed.

12. The storage apparatus according to claim 2, wherein the threshold is configured from configuration information including the frequency of the CPU, a capacity of the CPU cache, and a bandwidth of the CPU memory bus.

13. A data processing method of a storage apparatus which comprises one or two or more storage devices in which a plurality of volumes are constructed in a storage area; and
a controller which specifies an access target volume among the plurality of volumes on the basis of an access request from an access request source, and executes data I/O processing on the specified access target volume,
wherein the controller comprises a CPU which executes arithmetic processing and a CPU memory which is connected to the CPU via a CPU memory bus, and
wherein the CPU is configured from one or two or more CPU cores and a CPU cache which comprises a temporary area in a portion of a main storage area,
in which data processing method
the CPU executes:
a step of discriminating an attribute of the access target volume or target data which is the target of the data I/O processing on the basis of the access request; and
a step of selecting memory bus optimization execution processing or cache poisoning optimization execution processing in accordance with the discrimination result,
wherein, in the step of selecting the memory bus optimization execution processing, the CPU stores the target data among the data stored in the CPU memory in the main storage area of the CPU cache and loads the target data stored in the main storage area of the CPU cache into the CPU core, wherein, in the step of selecting the cache poisoning optimization execution processing, the CPU stores the target data among the data stored in the CPU memory in the temporary area of the CPU cache, and loads the target data stored in the temporary area of the CPU cache into the CPU core, and wherein the CPU core executes:

a step of at least checking the target data loaded from the main storage area of the CPU cache if the target data is loaded from the main storage area of the CPU cache, and a step of at least checking the target data loaded from the temporary area of the CPU cache if the target data is loaded from the temporary area of the CPU cache.

14. The data processing method according to claim 13, wherein, in the step of selecting the memory bus optimization execution processing, the CPU stores the apparatus internal authentication code appended to the target data in the main storage area of the CPU cache and loads the apparatus internal target code stored in the main storage area of the CPU cache into the CPU core, and wherein the CPU core continuously executes:

a step of generating an apparatus internal authentication code from the target data loaded from the main storage area of the CPU cache and checking the apparatus internal authentication code by comparing the generated apparatus internal authentication code with the apparatus internal target code loaded from the main storage area of the CPU cache, and a step of generating an inter-apparatus authentication code from the target data loaded from the main storage area of the CPU cache, and appending the generated inter-apparatus authentication code to the target data loaded from the main storage area of the CPU cache, wherein, in the step of selecting the cache poisoning optimization execution processing, the CPU stores the apparatus internal authentication code appended to the target data in the temporary area of the CPU cache, and loads the apparatus internal target code stored in the temporary area of the CPU cache into the CPU core, and wherein the CPU core separately executes:

a step of generating an apparatus internal authentication code from the target data loaded from the temporary area of the CPU cache and checking the apparatus internal authentication code by comparing the generated apparatus internal authentication code with the apparatus internal target code loaded from the temporary area of the CPU cache, and a step of generating an inter-apparatus authentication code from the target data loaded from the temporary area of the CPU cache, and appending the generated inter-apparatus authentication code to the target data loaded from the temporary area of the CPU cache.

15. The data processing method according to claim 13, wherein, in the step of selecting the memory bus optimization execution processing, the CPU stores the apparatus internal authentication code appended to the target data in the main storage area of the CPU cache from the CPU memory, stores data of a compression unit which is data including the target data in the main storage area of the CPU cache from the CPU memory, and loads the apparatus internal target code and the compression unit data which have been stored in the main storage area of the CPU cache into the CPU core, wherein the CPU core continuously executes:

a step of generating an apparatus internal authentication code from the target data loaded from the main storage area of the CPU cache and checking the apparatus internal authentication code by comparing the generated apparatus internal authentication code with the apparatus internal target code loaded from the main storage area of the CPU cache; and a step of compressing the data of the compression unit loaded from the main storage area of the CPU cache, wherein, in the step of selecting the cache poisoning optimization execution processing, the CPU stores the apparatus internal authentication code appended to the target data in the temporary area of the CPU cache from the CPU memory, stores data of a compression unit which is data including the target data in the temporary area of the CPU cache from the CPU memory, and loads the apparatus internal target code and the compression unit data which have been stored in the temporary area of the CPU cache into the CPU core, and wherein the CPU core separately executes:

a step of generating an apparatus internal authentication code from the target data loaded from the temporary area of the CPU cache and checking the apparatus internal authentication code by comparing the generated apparatus internal authentication code with the apparatus internal target code loaded from the temporary area of the CPU cache, and a step of compressing the data of the compression unit loaded from the temporary area of the CPU cache.

* * * * *